(12) United States Patent
Klug et al.

(10) Patent No.: US 12,213,638 B2
(45) Date of Patent: Feb. 4, 2025

(54) DISH RACK

(71) Applicant: Dorai Home, Inc., West Valley City, UT (US)

(72) Inventors: Jason Klug, Salt Lake City, UT (US); Kelsey O'Callaghan, Salt Lake City, UT (US)

(73) Assignee: Dorai Home, Inc., West Valley City, UT (US)

( * ) Notice: Subject to any disclaimer, the term of this patent is extended or adjusted under 35 U.S.C. 154(b) by 0 days.

(21) Appl. No.: 18/786,958

(22) Filed: Jul. 29, 2024

(65) Prior Publication Data
US 2024/0382063 A1    Nov. 21, 2024

Related U.S. Application Data

(63) Continuation-in-part of application No. 18/385,378, filed on Oct. 30, 2023, which is a continuation of
(Continued)

(51) Int. Cl.
| | |
|---|---|
| *A47L 19/04* | (2006.01) |
| *A47B 31/04* | (2006.01) |
| *A47B 55/02* | (2006.01) |
| *A47F 5/01* | (2006.01) |
| *A47F 7/00* | (2006.01) |

(Continued)

(52) U.S. Cl.
CPC ............... *A47L 19/04* (2013.01); *A47B 31/04* (2013.01); *A47B 55/02* (2013.01); *A47F 5/01* (2013.01); *A47F 7/0064* (2013.01); *A47G 23/0208* (2013.01); *A47J 47/16* (2013.01)

(58) Field of Classification Search
CPC .......... A47L 19/02; A47L 19/04; A47L 19/00; A47L 15/505; A47L 15/501; A47L 15/50; A47L 17/00; A47L 15/502; A47L 15/503; A47F 7/0064; A47F 5/01; A47J 47/16; A47J 47/20; A47B 81/04; A47B 55/02; A47G 19/08; A47G 23/0208; A47G 23/03;
(Continued)

(56) References Cited

U.S. PATENT DOCUMENTS

| | | | | |
|---|---|---|---|---|
| 62,082 A | * | 2/1867 | Smith .................... | A47L 19/02 |
| | | | | 4/656 |
| 894,938 A | * | 8/1908 | Brockman .............. | A47L 19/04 |
| | | | | 220/504 |

(Continued)

*Primary Examiner* — Devin K Barnett
(74) *Attorney, Agent, or Firm* — Headland Law & Strategy; Matthew J. Smyth

(57) ABSTRACT

A drying appliance may include a support frame, a planar drying rack and an absorbent tray. The support frame may include a first rectangular end and a second rectangular end, each of which may include a top rail, a bottom rail, a first side rail and a second side rail. Lower lateral rails and upper later rails may connect the first rectangular end to the second rectangular end. A planar drying rack may be disposed between the upper lateral rails and the lower lateral rails. An upper interior volume may be defined by a top surface of the planar drying rack, inner edges of the upper lateral rails and upper edges of the top rails of the first rectangular end and the second rectangular end. The planar drying rack may be free of upwardly extending projections within the upper interior volume.

19 Claims, 23 Drawing Sheets

Related U.S. Application Data application No. 17/694,319, filed on Mar. 14, 2022, now Pat. No. 11,800,965, which is a continuation of application No. 16/838,737, filed on Apr. 2, 2020, now Pat. No. 11,272,829.

(60) Provisional application No. 63/529,730, filed on Jul. 30, 2023, provisional application No. 62/828,245, filed on Apr. 2, 2019.

(51) Int. Cl.
 *A47G 23/02* (2006.01)
 *A47J 47/16* (2006.01)

(58) Field of Classification Search
 CPC ............... A47G 23/0216; A47G 23/02; A47G 23/0303; B65D 81/26
 See application file for complete search history.

(56) References Cited

U.S. PATENT DOCUMENTS

| | | | | |
|---|---|---|---|---|
| 921,192 | A * | 5/1909 | Wheeler | A47F 5/112 211/72 |
| 936,725 | A * | 10/1909 | Insinger | A47L 19/04 220/572 |
| 946,977 | A * | 1/1910 | Muller | A47L 19/04 294/142 |
| 1,341,717 | A * | 6/1920 | Lynch | A47L 19/04 211/41.3 |
| 1,493,948 | A * | 5/1924 | Apple | B65D 7/26 220/4.03 |
| 1,553,624 | A * | 9/1925 | Merseles | A47L 15/50 220/488 |
| 1,604,608 | A * | 10/1926 | Ryerson | A47L 19/04 220/572 |
| 1,742,886 | A * | 1/1930 | Warman | A47L 19/02 220/572 |
| 1,947,932 | A * | 2/1934 | Fante | B65D 7/065 294/143 |
| 1,947,933 | A * | 2/1934 | Fante | A23G 9/288 D32/55 |
| 1,971,523 | A * | 6/1934 | Feingold | A47L 19/04 211/41.5 |
| 2,095,811 | A * | 10/1937 | Goulooze | F25D 25/024 126/339 |
| 2,207,115 | A * | 7/1940 | Carr | F25D 25/021 312/246 |
| 2,284,494 | A * | 5/1942 | Oakley | E03C 1/186 4/657 |
| 2,340,645 | A * | 2/1944 | Hickman | A61J 9/0638 211/74 |
| 2,443,404 | A * | 6/1948 | Tallarico | A47L 19/02 211/41.4 |
| 2,479,118 | A * | 8/1949 | Jenness | A47L 19/04 211/195 |
| 2,516,088 | A * | 7/1950 | Einhorn | A47L 19/04 D32/55 |
| 2,596,735 | A * | 5/1952 | Suarez | A47L 19/02 4/581 |
| 2,620,083 | A * | 12/1952 | Moorhead | B65D 21/0211 220/511 |
| 2,697,525 | A * | 12/1954 | Breneman | A47L 19/04 D32/55 |
| 2,708,037 | A * | 5/1955 | Planeta | A47L 19/04 211/74 |
| 2,715,284 | A * | 8/1955 | Molina | A47L 19/02 34/238 |
| 2,739,715 | A * | 3/1956 | Planeta | A47L 19/04 211/74 |
| 3,568,848 | A * | 3/1971 | Tzifkansky | A47L 15/501 211/41.8 |
| 3,580,394 | A * | 5/1971 | Elliot | A47G 21/14 248/316.3 |
| 3,952,875 | A * | 4/1976 | Lombardo | A47J 47/16 211/41.6 |
| 4,531,641 | A * | 7/1985 | Archambault | A47L 19/02 211/208 |
| 4,531,696 | A * | 7/1985 | Bettesworth | A47G 21/14 248/37.3 |
| 4,589,556 | A * | 5/1986 | Peretz | A47L 15/505 211/41.9 |
| 4,854,537 | A * | 8/1989 | Welch | A47B 81/04 4/656 |
| 4,948,079 | A * | 8/1990 | Baeta | A47K 5/02 D6/540 |
| 5,012,934 | A * | 5/1991 | Newhall | A47L 19/00 D32/55 |
| 5,119,943 | A * | 6/1992 | Hoang | A47L 19/00 211/168 |
| 5,158,184 | A * | 10/1992 | Craft | A47L 19/04 D32/55 |
| 5,169,603 | A * | 12/1992 | Landsberger | B01L 9/06 211/74 |
| 5,385,261 | A * | 1/1995 | Lippisch | A47L 19/02 220/572 |
| 5,704,492 | A * | 1/1998 | Bartko | A47J 47/20 211/41.3 |
| 5,718,343 | A * | 2/1998 | Belokin | A47F 5/0892 211/188 |
| D398,725 | S * | 9/1998 | Merkel | D32/55 |
| 6,135,296 | A * | 10/2000 | Colgrove | A47L 15/505 211/41.8 |
| 6,161,718 | A * | 12/2000 | Monbo | A47L 19/04 220/486 |
| 6,357,605 | B1 * | 3/2002 | Martorella | A47L 19/04 211/41.6 |
| 6,371,312 | B1 * | 4/2002 | Tsuchida | A47G 21/14 248/37.3 |
| 6,394,285 | B1 * | 5/2002 | Arthurs | A47L 15/505 211/41.9 |
| 6,491,170 | B1 * | 12/2002 | Madela | A47L 19/04 211/41.3 |
| 6,505,746 | B1 * | 1/2003 | Johnson | A47J 47/16 248/37.3 |
| 6,581,774 | B1 * | 6/2003 | Galafassi | A47G 21/14 206/553 |
| D495,213 | S * | 8/2004 | Compagnucci | D7/601 |
| D518,615 | S * | 4/2006 | Yang | D32/55 |
| D518,936 | S * | 4/2006 | Yang | D32/55 |
| D545,020 | S * | 6/2007 | Yang | D32/55 |
| D554,819 | S * | 11/2007 | Shah | D32/55 |
| D555,311 | S * | 11/2007 | Yang | D32/55 |
| 7,766,175 | B2 * | 8/2010 | Jadhav | A47L 15/505 211/41.9 |
| D634,089 | S * | 3/2011 | Wisniewski | D32/55 |
| 8,087,108 | B2 * | 1/2012 | Burns | E03C 1/186 211/41.6 |
| 8,701,898 | B2 * | 4/2014 | Chai | A47L 15/505 211/41.6 |
| 8,714,371 | B2 * | 5/2014 | Haider | A47L 15/503 211/41.4 |
| 8,925,742 | B1 * | 1/2015 | Chitayat | A47L 19/04 211/41.6 |
| 8,925,743 | B1 * | 1/2015 | Lee | A47L 19/04 211/41.6 |
| 8,960,452 | B2 * | 2/2015 | Rhodes, II | A47L 19/04 211/41.6 |
| 9,173,543 | B2 * | 11/2015 | Abraham | A47B 73/00 |
| D761,512 | S * | 7/2016 | Eilmus | D32/55 |
| D783,216 | S * | 4/2017 | Huang | D32/55 |
| D787,769 | S * | 5/2017 | Evans | D32/58 |
| 9,730,571 | B1 * | 8/2017 | Lee | A47L 19/04 |
| 9,926,954 | B2 * | 3/2018 | Sortino | F16B 1/00 |
| 9,949,595 | B1 * | 4/2018 | Greenwood | A47J 47/16 |
| D819,289 | S * | 5/2018 | Umholtz | D32/55 |
| 10,555,606 | B2 * | 2/2020 | Fischer | A47B 73/004 |
| D882,199 | S * | 4/2020 | Cao | D32/55 |
| D887,098 | S * | 6/2020 | Li | D32/55 |

(56) References Cited

U.S. PATENT DOCUMENTS

| | | | |
|---|---|---|---|
| 10,694,922 B1* | 6/2020 | Audibert | A47L 15/505 |
| D897,621 S * | 9/2020 | Klug | D32/55 |
| D897,622 S * | 9/2020 | Klug | D32/57 |
| 2001/0040141 A1* | 11/2001 | Martorella | A47L 19/04 211/41.6 |
| 2004/0238464 A1* | 12/2004 | Cheung | A47L 19/02 211/41.3 |
| 2005/0145583 A1* | 7/2005 | Martorella | A47L 19/04 211/41.6 |
| 2005/0167374 A1* | 8/2005 | Yang | A47L 15/502 211/41.18 |
| 2005/0167381 A1* | 8/2005 | Fariello | A47J 36/24 211/195 |
| 2005/0236344 A1* | 10/2005 | Yang | A47L 19/04 211/41.4 |
| 2006/0137725 A1* | 6/2006 | Yang | A47L 19/04 134/58 D |
| 2006/0138064 A1* | 6/2006 | Crudgington | A47L 15/505 211/41.9 |
| 2006/0169652 A1* | 8/2006 | Yang | A47G 21/14 211/41.3 |
| 2006/0234899 A1* | 10/2006 | Nekmard | C11D 3/48 510/439 |
| 2006/0243681 A1* | 11/2006 | Bastuji | A47L 15/502 211/41.8 |
| 2006/0283817 A1* | 12/2006 | Yang | A47L 19/04 211/41.4 |
| 2007/0039904 A1* | 2/2007 | Purushothaman | A47L 15/504 211/41.8 |
| 2007/0039905 A1* | 2/2007 | Purushothaman | A47L 15/503 211/41.8 |
| 2007/0090063 A1* | 4/2007 | Schmidt | A47L 19/04 211/41.3 |
| 2007/0131629 A1* | 6/2007 | Sullivan | A47L 19/04 211/41.3 |
| 2007/0144984 A1* | 6/2007 | Sullivan | A47L 19/04 211/41.3 |
| 2008/0116155 A1* | 5/2008 | Yang | A47L 19/04 211/41.3 |
| 2008/0135505 A1* | 6/2008 | Frankel | A47L 19/04 211/41.3 |
| 2008/0136301 A1* | 6/2008 | Harbison | A47B 88/981 248/37.3 |
| 2008/0156750 A1* | 7/2008 | Richardson | A47L 15/505 211/41.9 |
| 2008/0179264 A1* | 7/2008 | Abrams | A47L 19/02 34/104 |
| 2008/0185352 A1* | 8/2008 | O'Hara | A47L 19/02 211/13.1 |
| 2008/0251472 A1* | 10/2008 | Kasden | A47J 36/06 211/41.2 |
| 2008/0283480 A1* | 11/2008 | Segall | A47L 19/04 211/41.6 |
| 2008/0302740 A1* | 12/2008 | Moser | A47L 15/503 211/41.8 |
| 2009/0050585 A1* | 2/2009 | Lindgren | A47L 15/502 248/37.3 |
| 2009/0211994 A1* | 8/2009 | Yang | A47L 19/04 211/41.3 |
| 2010/0059460 A1* | 3/2010 | Mulaw | A47L 19/04 211/41.3 |
| 2010/0065517 A1* | 3/2010 | Lam | A47L 19/04 211/41.3 |
| 2010/0187135 A1* | 7/2010 | Broering | B65F 1/0006 206/524.2 |
| 2010/0310810 A1* | 12/2010 | Bond | B32B 5/22 428/74 |
| 2012/0181242 A1* | 7/2012 | Jeong | A47L 15/502 312/228.1 |
| 2012/0291824 A1* | 11/2012 | Bhajak | A47L 15/4246 134/135 |
| 2013/0026118 A1* | 1/2013 | De Lourdes Mireles | A47G 23/0241 211/74 |
| 2014/0014605 A1* | 1/2014 | Kilgore | A47L 15/501 211/85.25 |
| 2014/0217869 A1* | 8/2014 | Eng | A47L 15/503 211/41.9 |
| 2014/0251930 A1* | 9/2014 | Pargansky | A47L 19/04 211/16 |
| 2014/0263111 A1* | 9/2014 | Micek | A47L 19/04 211/41.6 |
| 2014/0332479 A1* | 11/2014 | Audet | A47J 47/20 211/41.3 |
| 2015/0013717 A1* | 1/2015 | Freese | A41D 19/0068 134/6 |
| 2015/0053238 A1* | 2/2015 | Lee | A47L 15/502 134/18 |
| 2015/0209788 A1* | 7/2015 | Dickinson | B01L 7/02 211/74 |
| 2016/0066767 A1* | 3/2016 | Villasenor | A47L 19/04 220/601 |
| 2016/0068325 A1* | 3/2016 | Prommel | A47J 47/005 206/576 |
| 2016/0106266 A1* | 4/2016 | Heron | A47J 45/00 220/574 |
| 2016/0113479 A1* | 4/2016 | Hawker | A47L 19/04 211/41.6 |
| 2016/0206176 A1* | 7/2016 | Eilmus | A47J 47/20 |
| 2017/0188704 A1* | 7/2017 | Lipper Mccauley | B60B 33/066 |
| 2017/0245730 A1* | 8/2017 | Dunn | A47L 19/04 |
| 2017/0292786 A1* | 10/2017 | McConnell | A47L 19/02 |
| 2018/0116485 A1* | 5/2018 | Wegner | A47L 19/04 |
| 2018/0235434 A1* | 8/2018 | Sauceda | A47L 19/04 |
| 2018/0249886 A1* | 9/2018 | Thompson | B32B 27/32 |
| 2019/0029473 A1* | 1/2019 | Bauer | A47L 15/0013 |
| 2019/0038110 A1* | 2/2019 | Manooki | A47B 81/04 |
| 2019/0038458 A1* | 2/2019 | Igaue | A61P 43/00 |
| 2019/0133413 A1* | 5/2019 | Maslana | A47B 96/021 |
| 2019/0159632 A1* | 5/2019 | Stevens | A47B 77/18 |
| 2019/0353511 A1* | 11/2019 | Forutanpour | A47J 9/003 |
| 2019/0374068 A1* | 12/2019 | Jones | A47J 47/16 |
| 2019/0374069 A1* | 12/2019 | Klug | A47K 3/002 |
| 2020/0121134 A1* | 4/2020 | Groll | A47B 55/02 |
| 2020/0229676 A1* | 7/2020 | Olson | A47L 19/02 |
| 2020/0245845 A1* | 8/2020 | Klug | A47L 19/02 |

* cited by examiner

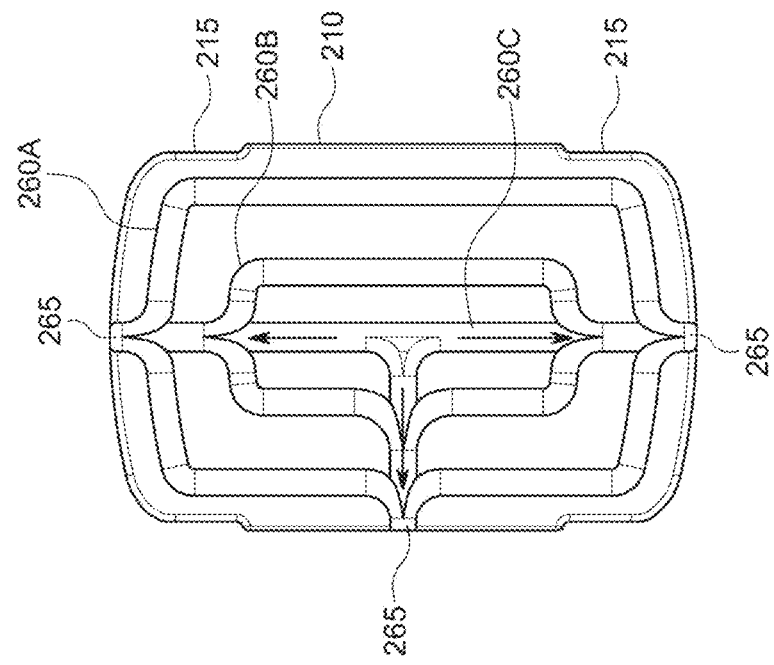
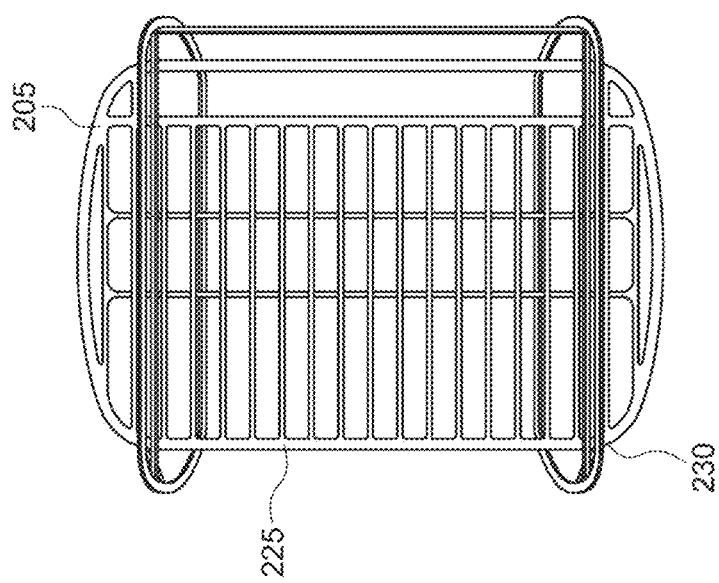
FIG. 11

DISH RACK

CROSS-REFERENCE TO RELATED APPLICATIONS

This application is a continuation-in-part of U.S. patent application Ser. No. 18/385,378, titled "Drying Appliance," filed Oct. 30, 2023; which is a continuation of U.S. patent application Ser. No. 17/694,319, titled "Drying Appliance," filed Mar. 14, 2022, now U.S. Pat. No. 11,800,965; which is a continuation of U.S. patent application Ser. No. 16/838,737, titled "Drying Appliance," filed Apr. 2, 2020, now U.S. Pat. No. 11,272,829; which claims priority to U.S. Provisional Application No. 62/828,245, titled "Drying Rack and Drain Tray Assembly," filed Apr. 2, 2019. This application further claims priority to U.S. Provisional Application No. 63/529,730, titled "Drying Appliance," filed Jul. 30, 2023. This application incorporates the entire contents of the foregoing applications by reference.

BACKGROUND

In kitchens it is common to use a drying rack adjacent to the kitchen sink for the collection of wet or partially dried dishes subsequent to the manual washing of the dishes in the sink. Typically the dishes are rinsed and placed in specialized compartments in the rack. A series of apertures and/or through slots extend through the bottom of the rack, through which water from the dishes is allowed to drain by gravity.

FIG. 1 illustrates two conventional drying racks 1A and 1B which are generally composed either of rubber or plastic polymer (see 1A) or often polymer coated metal wires (see 1B). In use, a conventional drain tray 10 is positioned beneath the racks 1A and 1B and generally includes a central platform area 13, bounded by raised sidewalls 11, on which the rack 1 is supported. The water dripping from the racked dishes collects upon the platform area 13 of the drain tray 2, out of contact with the dishes, thereby accelerating the draining and drying of the dishes. Some drain trays 2 in common use provide an outlet channel 12 at one end of the platform area 13. The outlet channel 12, or groove, is often directed over a sink. In this way excess water collected by the drain tray 10 can be diverted to the sink. Other drain trays 10 may merely collect the water in the platform area 13, for eventual disposition by way of evaporation or manual emptying.

While the above conventional drying rack 1 and drain tray 10 assemblies are well accepted in the industry and have met with commercial success, several shortcomings prevent existing rack and tray sets from satisfying all of the consumer and manufacturer's needs.

Traditional drying racks 1 and traditional drain trays 10 for drying glassware, dishes, and utensils, for example, are generally prone to remaining wet for long durations of time especially under multiple daily use. Moreover, the extended use of such conventional drying racks 1 and drain tray 10 assemblies are prone to the growth of fungus and bacteria thereon, which may be unhealthy, produce an unpleasant odor, or unpleasant appearance. Additionally, the use of such traditional drying racks 1 and drain tray 10 assemblies may cause spreading of germs and viruses during an extended use and lifetime thereof. And, when used in a facility where multiple meals and dirty dishes are made per day the concerns regarding the likelihood that a drain tray 10 in particular will accumulate and remain wet and promote mold and bacteria growth is of increased concern.

Another concern regarding the design of the drying rack 1 is the accommodation of different sizes and shapes of dishes, glassware, utensils, and even cutting boards. This limited adaptability of the conventional drying rack 1 design can be further exasperated where the applicable drying requirements extend beyond the typical sizes and shape of the average dinnerware set. For example, in some instances the ability to accommodate the bottles, bowls, plates, and utensils of infants are limited by the conventional design of the drying rack 1 to hold 6-12 inch plates, traditional knives, forks, bowls, and glassware for older people. As another example, a user may desire to clean and dry pet food containers such as food and water bowls which may not be adapted for use in a conventional drying rack 1 configuration.

Moreover, often certain consumers are not able to customize the conventional drying rack layout, size, and are unable to accommodate certain wine, champagne, martini, or other glassware. Moreover, a household may use an inordinate amount of utensils for example, as compared to reusing or disposal of drinkware. And, the conventional drying rack 1A and 1B are not typically readily adaptable for drying different sizes and shapes of a cutting board, or length and size of a knife. Rather, referring still to FIG. 1, the shape, design, and layout of the convention drying rack 1 is fixed upon manufacture. That is, the layout and capability of the various features of the conventional drying rack 1 are set upon manufacture is not reconfigurable for a particular use of individual's needs.

Moreover, often the conventional drying rack 1 may not consider whether the drying rack 1 is to be used on the left or right side of a sink. The layout of the drying rack 1 traditionally did not consider the variable placement of components thereon. The drying rack 1 was not reconfigurable for the particular arrangement of dishes, utensils, or even a cutting board so as to optimize the access to the sink and counter as well as the kitchenware being dried. The ability to adjust the angle, slope, and configuration of the drain tray 10 relative to the drying rack 1 has also traditionally be fixed.

Accordingly, there exists a need for an improved drying appliance including an improved drying rack and drain tray assembly, such as adjacent to sinks in kitchens, which avoids hygiene related problems that may occur due to an extended use of the often saturated drain tray. There also exists a need for a new design of drain tray that dries rapidly so as to wick and draw moist air and liquid away from the dishes so as to further increase the rate of which the dishes dry. There is also a need for improved drain tray layout and customized and reconfigurable design and layouts. Such environments and concerns are illustrative of a large genus of applications and concerns discussed herein.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

In some embodiments, a drying appliance includes a support frame, a planar drying rack and an absorbent tray. The support frame may include a first rectangular end and a second rectangular end, each of which may include a top rail, a bottom rail, a first side rail and a second side rail. Lower lateral rails may connect the first rectangular end to the second rectangular end. The connection may be adjacent intersections of the first side rails and the bottom rails or adjacent intersections of the second side rails and the bottom rails. Upper lateral rails may connect the first rectangular end to the second rectangular end.

The planar drying rack may be disposed between the upper lateral rails and the lower lateral rails, and it may be characterized by a rack width. The planar drying rack may include a secondary grate disposed below a top surface of the planar drying rack. The secondary grate may have a grate width that is less than the rack width, such that dishware disposed vertically through apertures in the planar drying rack can be supported by the secondary grate.

The absorbent tray may include a first diatomaceous earth slab and a second diatomaceous earth slab. The support frame may be characterized by a length that is parallel to the upper lateral rails and the lower lateral rails. When the drying appliance is assembled for use, the first diatomaceous earth slab and the second diatomaceous earth slab may extend beyond the length.

An upper interior volume may be defined by the top surface, inner edges of the upper lateral rails and upper edges of the top rails of the first rectangular end and the second rectangular end. The planar drying rack may be free of upwardly extending projections within the upper interior volume.

The drying appliance may further include a utensil compartment that is configured to be disposed on one of the first rectangular end or the second rectangular end. The utensil compartment may include a lower hanger that rests on the planar drying rack and an upper hanger that couples to the respective top rail of the one of the first rectangular end or the second rectangular end. The upper hanger may further include a detent that removably clips the utensil compartment to the respective top rail. The drying appliance may include a second utensil compartment having a lid with a plurality of slits, each of which is configured to receive a blade of a knife.

The drying appliance may further include a glass rack that is configured to be disposed on one of the first rectangular end or the second rectangular end. The glass rack may include a plurality of mounting arms, each of which may include a support section that is configured to be disposed around a top and two opposing sides of a first rail on the planar drying rack. A lateral segment may extend away from the support section. A clip may be configured to contact more than one-quarter of the circumference of a second rail on the planar drying rack that is parallel to the first rail. A detent may removably clip the glass rack to the second rail. A compressible and resilient cushion may be disposed on the end of each of the plurality of glassware hangers.

The glass rack may include a curved channel comprising a wall disposed opposite the plurality of support sections and extending along a length of the glass rack. The glass rack may further include a plurality of glassware hangers extending away from the wall that are configured to support an upside-down item of glassware while a rim of the upside-down item of glassware is in contact with the wall. The curved channel may include one or more drainage slots, and the walls of the curved channel may slope towards the drainage slots.

When the drying appliance is disassembled for shipment, each of the utensil compartment, second utensil compartment and glass rack may be disposed in an upper box that can be wholly contained within the upper interior volume.

A lower interior volume may be defined by a bottom portion of the planar drying rack, inner edges of the first and second side rails, and upper edges of the bottom rails of the first rectangular end and the second rectangular end. When the drying appliance is assembled for use, each of the first diatomaceous earth slab and the second diatomaceous earth slab may be disposed on the lower lateral rails and the bottom rails. When the drying appliance is disassembled for shipment, each of the first diatomaceous earth slab and the second diatomaceous earth slab may be disposed in a lower box that can be wholly contained within the lower interior volume.

When the drying rack is disassembled for shipment, the upper box may be disposed in the upper interior volume of the support frame, the lower box may be disposed in the lower interior volume, and all may be disposed in an outer box for shipment, such that the support frame surrounds and protects the first diatomaceous earth slab, the second diatomaceous earth slab, the utensil compartment, the second utensil compartment and the glass rack.

BRIEF DESCRIPTION OF THE DRAWINGS

To further clarify the above and other advantages and features, a more particular description is rendered by reference to specific embodiments thereof which are illustrated in the appended drawings. It is appreciated that these drawings depict only typical embodiments and are therefore not to be considered limiting scope.

FIG. 11 illustrates a drain tray having channels and spouts for diverting excess rinse water therefrom.

DETAILED DESCRIPTION

Figure 1:
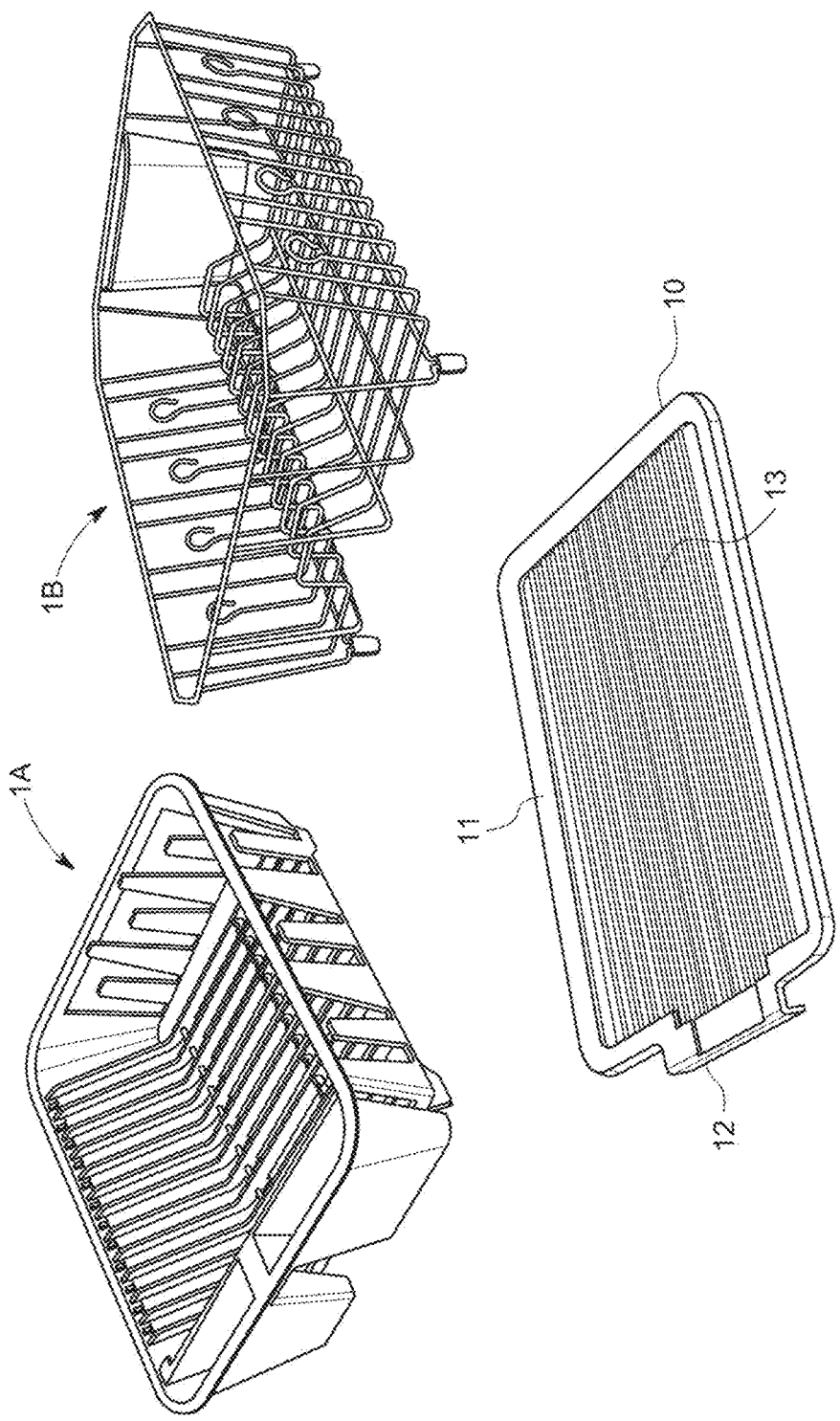
FIG. 1 illustrates a conventional drying rack and drain tray.

Embodiments relate to a drying appliance including a drying rack and a rapidly drying drain tray assembly. Such embodiments further include adaptable and interchangeable accessories for selectable placement and scaling of the size, amount and placement of features for managing the capacity and location of the drying accessories. The embodiments disclosed herein enable advantageous manufacturing processes, designs, and assemblies of components, materials, and manufactures.

As previously discussed the old wire baskets and moldy plastic bins are prone to retaining moisture drained from such conventional drying racks. This retained moisture is prone to collecting mold and bacteria over repeated use thereof. Moreover, the utility of the drying features of the traditional drying rack is set upon manufacture and is not customizable, nor modular, as compared to various innovative embodiments disclosed hereinafter and shown in the drawings. The combined improvements provided by the embodiments illustrated herein is a modern way to dry hand-washed dishes with customizable accessories. Examples, of such selectable and rearrangeable accessories can including knife holders, bottle or cup holders, and a utensil cage, or multiples thereof, for example. The positioning and arrangement of such accessories can be place around and fitted to one or more peripheral racks or rails. The peripheral racks and rails can provide support to the modular accessories as well as other kitchenware such as a cutting board, dishware including bowls, plates, and cups.

The drain tray includes an absorptive base. The absorptive base instantly wicks, absorbs, and evaporates water away from the drying kitchenware to lower relative humidity and to prevent mold and bacteria from growing thereon. The drying rack can include a built-in cutting board holder that provides extra space for pots, pans, and bowls. The drying rack can include modern durable steel rails that can be customized for each person's particular needs from home chefs, to athletes, to new moms and dads. The accessories can be purchased, used, and arranged individually, for example. Such unique drying rack design helps keep the sink space clean.

The drying rack design helps keep dishes organized and secure, dries them quickly and helps keep the area around a sink clean. Moreover, conventional drying racks are particularly prone to aging including rust, plastic fatigue, and breakage. The drying rack and drain tray are also nicely styled and don't look like the conventional designed in the 1930's. The dish rack is well constructed, sturdy and there is no need to worry about rust. The diatomaceous earth base of the drain tray wicks up water and dries very quickly.

Accessories for the drying rack can include any arrangement and selection of accessories. For example, one set might include a knife block, two bottle/cup holders, and as utensil cage depending on the dimensions of the drying rack. According to one illustrative embodiments, some examples of dimensions can include a length of 22.52 inches (57.2 cm), a width of 16.54 inches (42 cm) and a height 6.34 inches (16.1 cm).

Some embodiments disclosed herein are directed to the manufacture and assembly of a composite drying rack, drain tray assembly, and accessories as well as intermediate manufactures, features, and parts thereof. The drying rack and drain tray assembly can be in the form of multiple assembled parts in the form of a drying rack made of a plastic, metallic, and/or wood component(s) with a drain tray comprising a wicking absorptive earth element. The composite parts, elements, and modular accessory adaptors may be manufactured from distinct materials and assembled together. Assembly of one or more components can include mechanical features for assembling and fastening the components or layers together or the components can be connected such as by welds, joints, connectors, or fasteners. The shape of the drying rack, modular components, and draining tray may interrelate in that outer and inner periphery attachments and components may correspond, or fit, with a shape of another component such that when assembled the composite assembly can be an aesthetically pleasing, more adaptable, and functionally superior to the conventional designs previously discussed.

The rapid drying drain tray can include the rapidly wicking and drying earth material called diatomaceous earth. Diatomaceous earth—also known as D.E., diatomite, or kieselgur/kieselguhr—is a naturally occurring, soft, siliceous sedimentary rock that is traditionally easily crumbled into a fine white to off-white powder. It has a particle size ranging from less than 3 μm to more than 1 mm, but typically 10 to 200 μm. Depending on the granularity, this powder can have an abrasive feel, similar to pumice powder, and has a low density as a result of its high porosity. The typical chemical composition of oven-dried diatomaceous earth is 80-90% silica, with 2-4% alumina (attributed mostly to clay minerals) and 0.5-2% iron oxide.

Diatomaceous earth consists of fossilized remains of diatoms, a type of hard-shelled protist (chrysophytes). As disclosed herein the layer or component of diatomaceous earth of the mat is used as an absorbent and rapid evaporator for liquids. The thermal properties of diatomaceous earth also enable it to be used as the barrier material according to several embodiments disclosed herein.

For example, several embodiments disclosed herein include a diatomaceous earth layer or component forming the drain tray. In some embodiments, the entire drain tray can be made of diatomaceous earth. While a drain tray comprising diatomaceous earth is disclosed herein other products and kitchenware can be similarly configured. The placement of the diatomaceous earth layer or component immediately below the drying rack component allows for the diatomaceous earth to rapidly wick and absorb the moisture away from the dishes, glassware, and utensils thereby rapidly removing saturation of water from the drying environment. Once absorbed by the diatomaceous earth layer, the repeated saturation of the drain tray is more rapidly evaporated and dried as compared to traditional drying rack and drain tray assemblies.

Figure 2:
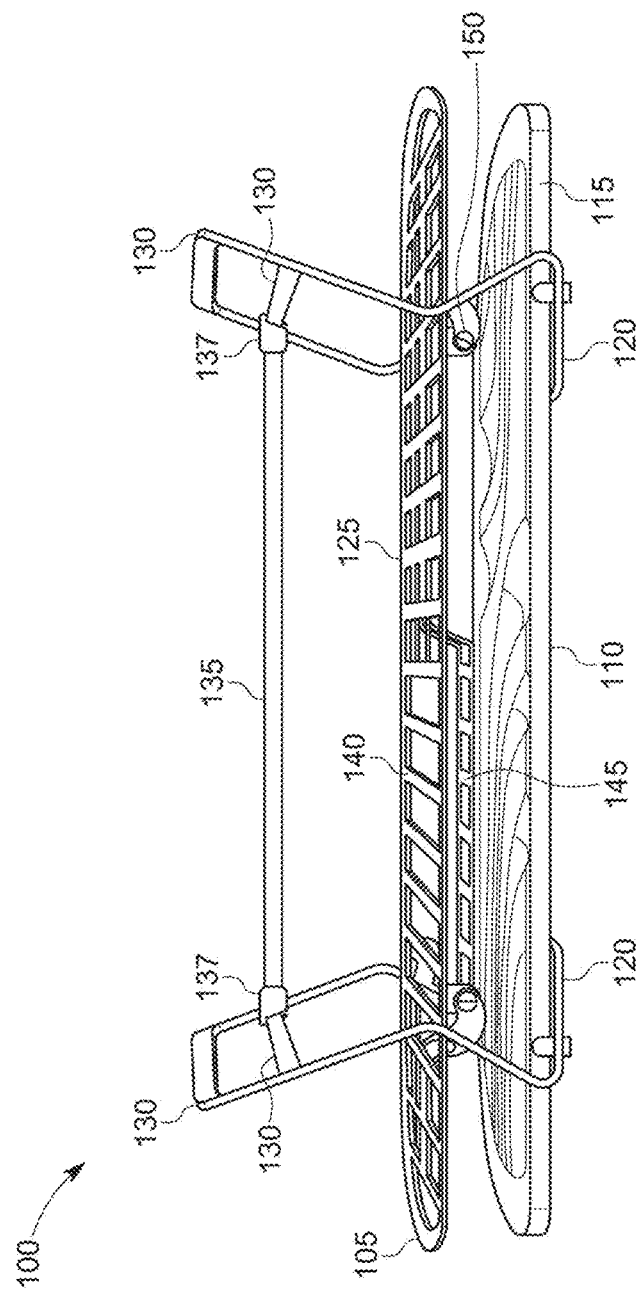
FIG. 2 illustrates an appliance including a drying rack and drain tray.
Figure 3:
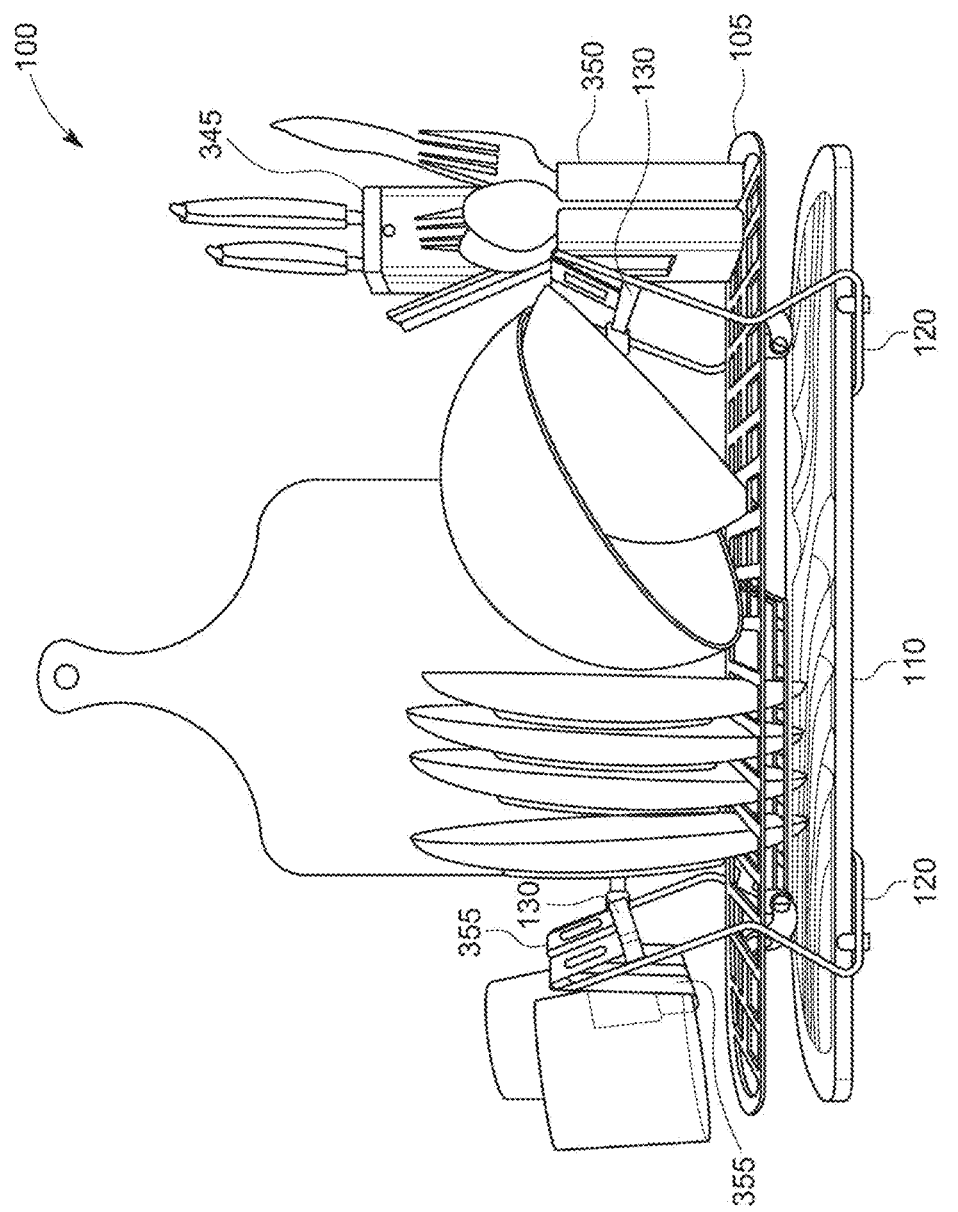
FIG. 3 illustrates the appliance including the drying rack and drain try along with several accessories for supporting kitchenware after being washed.

Referring to FIGS. 2 and 3, a first example of a drying appliance 100 is shown including a drying rack 105 and a drain tray 110. The drain tray 110 is generally rectangular with rounded corners and has four cutouts 115 for accommodating and locating four cantilevered legs 120 of the drying rack 105 thereby securely and precisely placing the drain tray 110 relative to the drying rack 105 when assembled. The drain tray 110 is made of a diatomaceous earth wicking material as opposed to the molded plastic or rubber polymer material of the prior art thereby more rapidly drawing moisture away from dishes, glassware, and utensils placed upon the drying rack 105 as shown in FIG. 3. The use of the diatomaceous earth drain tray 110 results in more rapid and complete evaporation of water from the kitchenware, drying rack 105, and drain tray 110.

The drying rack 105 can be generally rectangular with rounded corners, having a base rack 125 and opposing downward angled end supports 130 made of metal rails. The end supports 130 can be further connected together by a lateral support rail 135 which also provides lateral support to a cutting board or other larger dish held within a recessed receptacle of the base rack 125. The recessed receptacle can extend along a length of the drain tray 105 thereby allowing for additional placement of dishes within the base rack 125 and perpendicular thereto.

Figure 4:
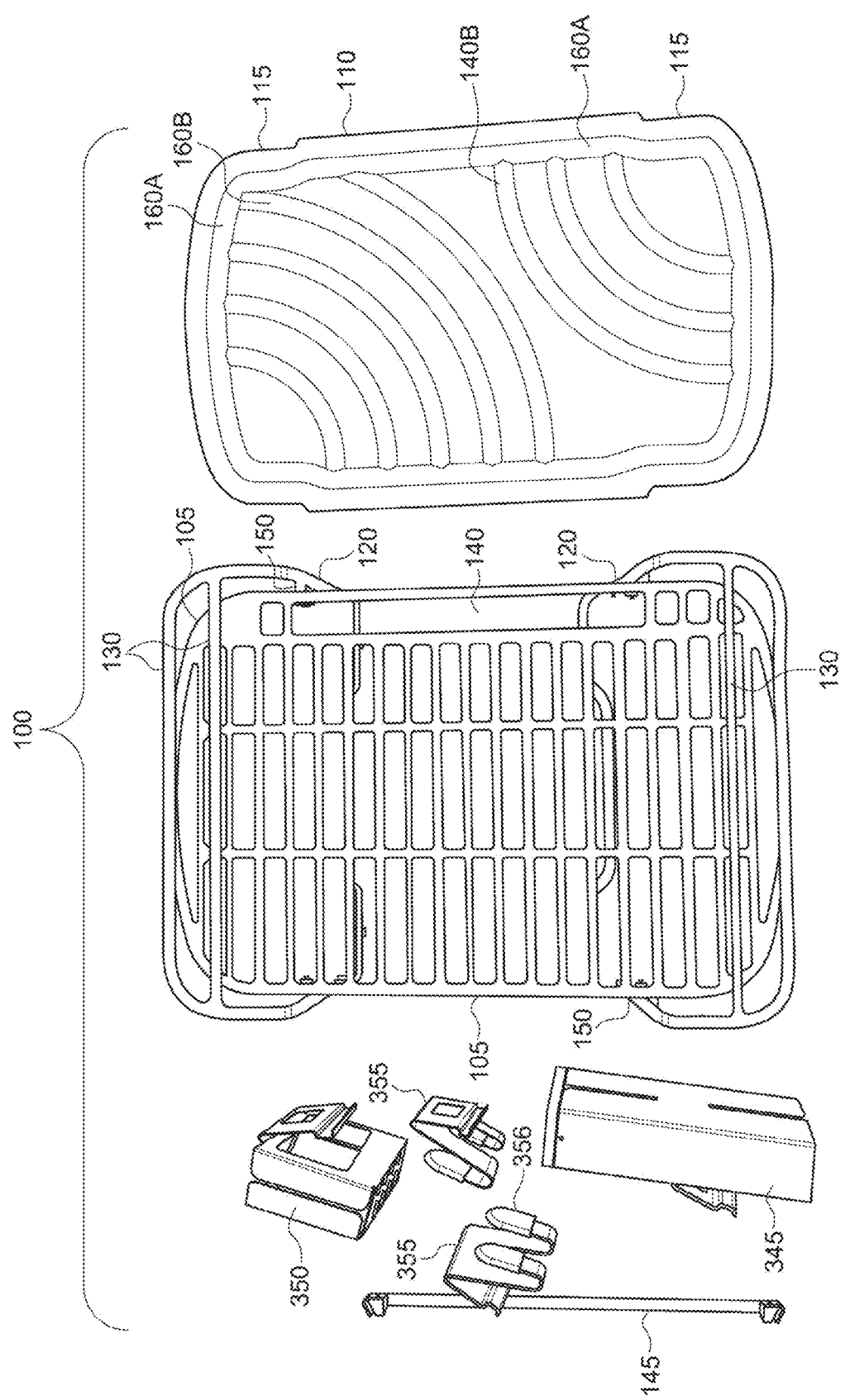
FIG. 4 illustrates examples of components of the unassembled appliance.
Figure 5:
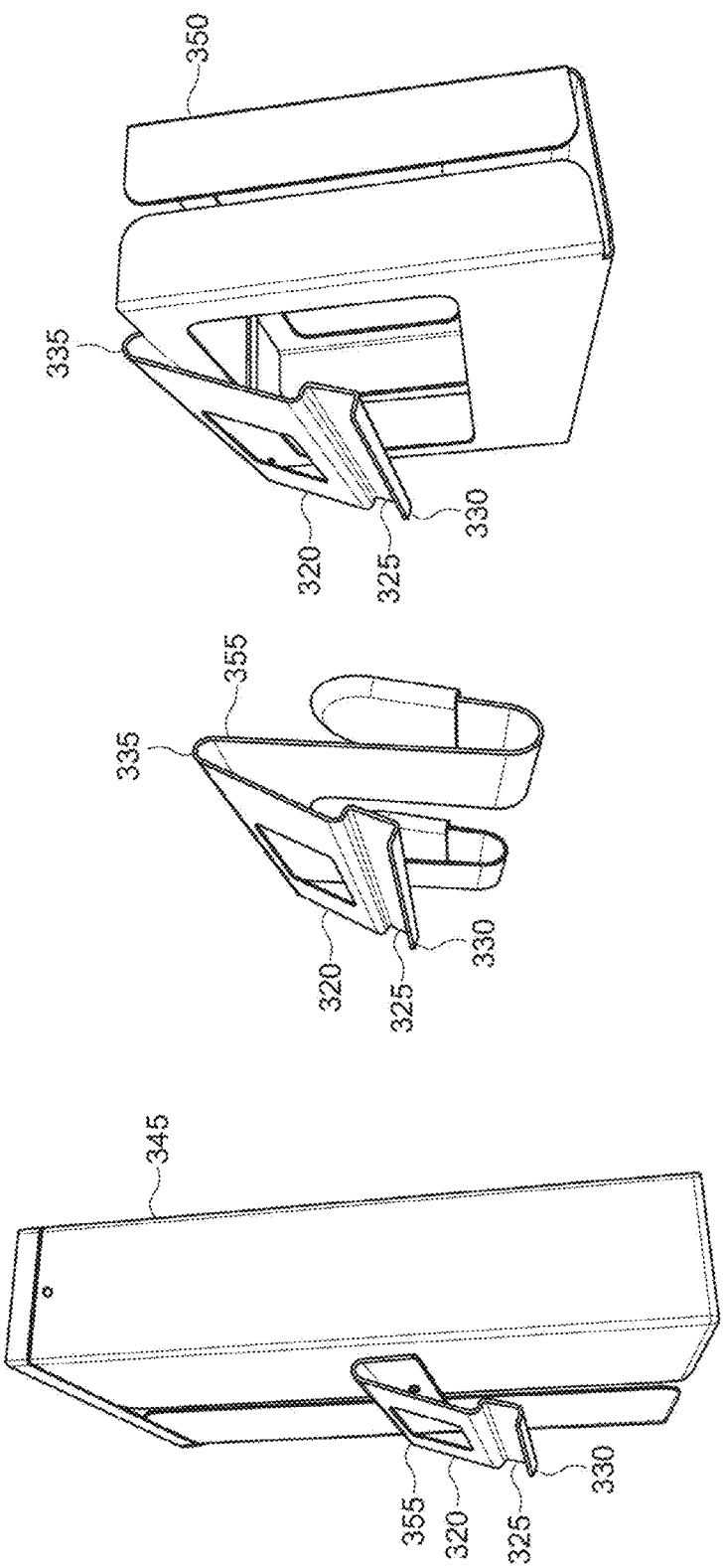
FIG. 5 illustrates some examples of hanging accessories for supporting utensils, glassware, and cutlery.

Referring to FIGS. 4 and 5, the drying appliance 100 can include various assemblable and connectable modular attachments. The use of interchangeable modular attachments that can be interchangeable, customized, and optimized in placement, type, and size can be optimal to various households. As shown in FIGS. 4 and 5, the attachments can include a cutlery attachment 345, a utensil attachment 350, and two glassware attachments 355. Other attachments can be interchangeable and used for accommodating many different objects, dishes, bowls, glassware, cutlery, bottles, tools, and custom configurations for special applications and purposes. Moreover, as previously discussed, the location of the assembly 100 relative to a sink, counter, or placement layout is easily reconfigurable according to the teachings disclosed herein.

Figure 6:
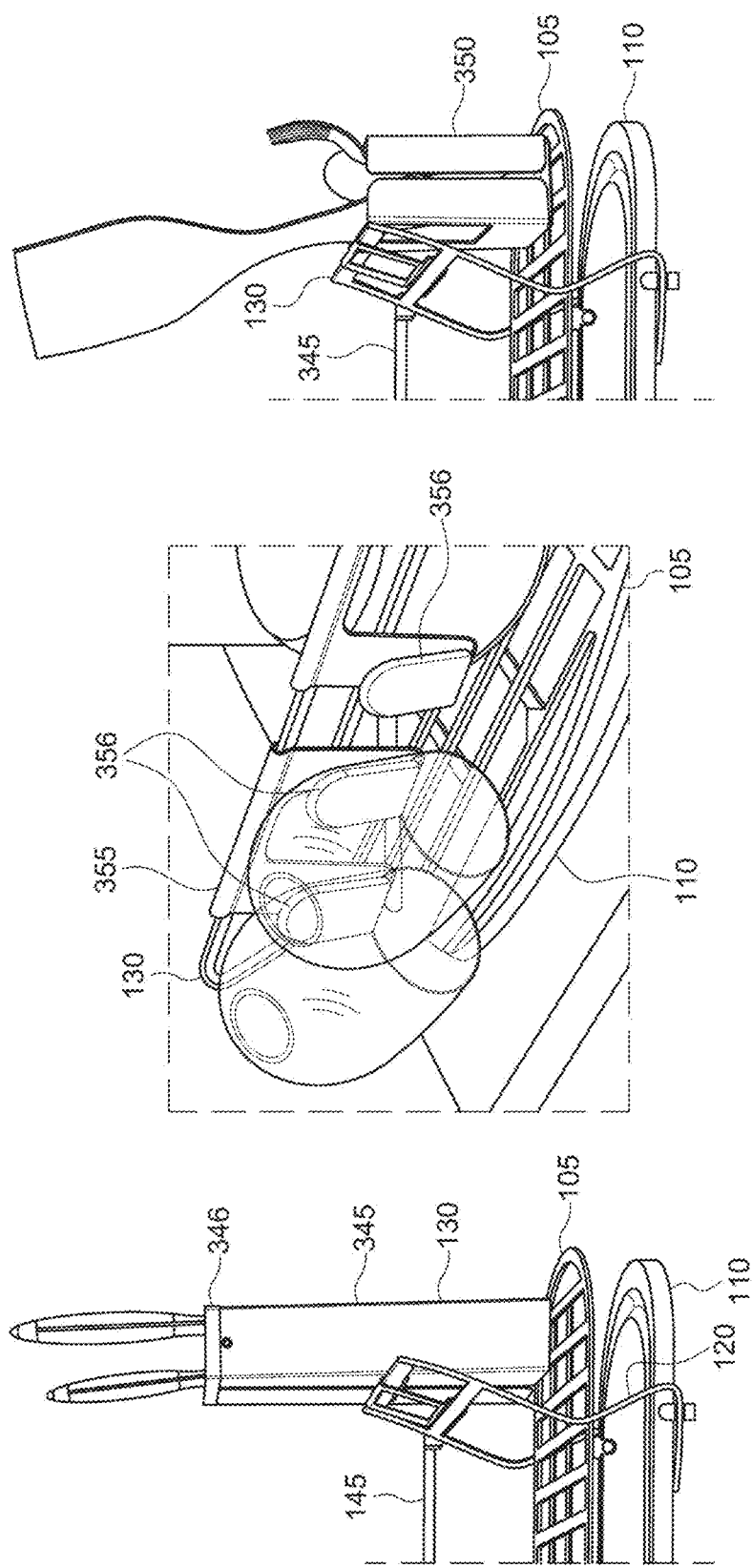
FIG. 6 illustrates the accessories in a hanging position supported by rails of the drying rack while supporting utensils, glassware and cutlery.
Figure 7:
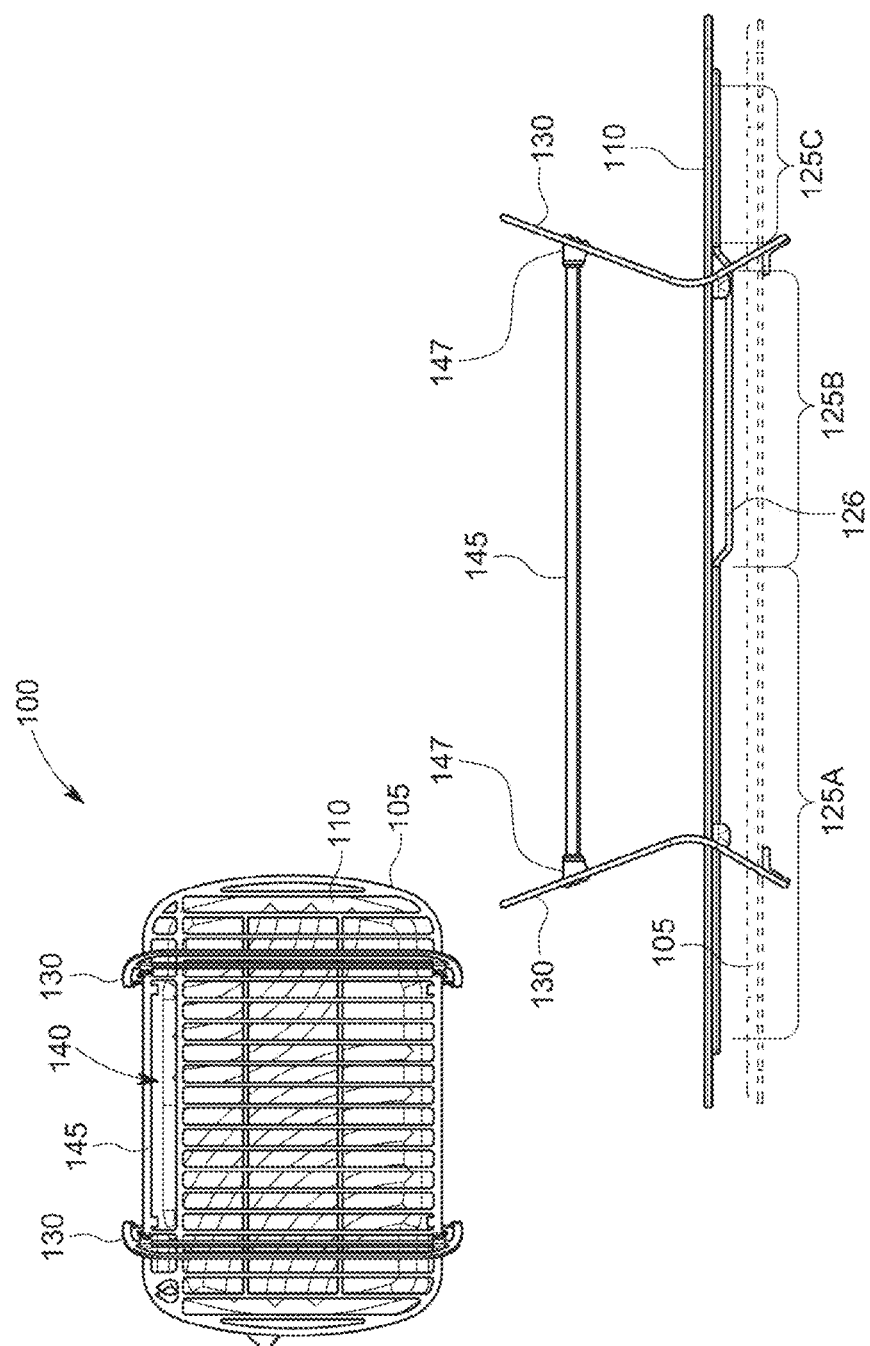
FIG. 7 illustrates a side view and top view of the appliance.
Figure 8:
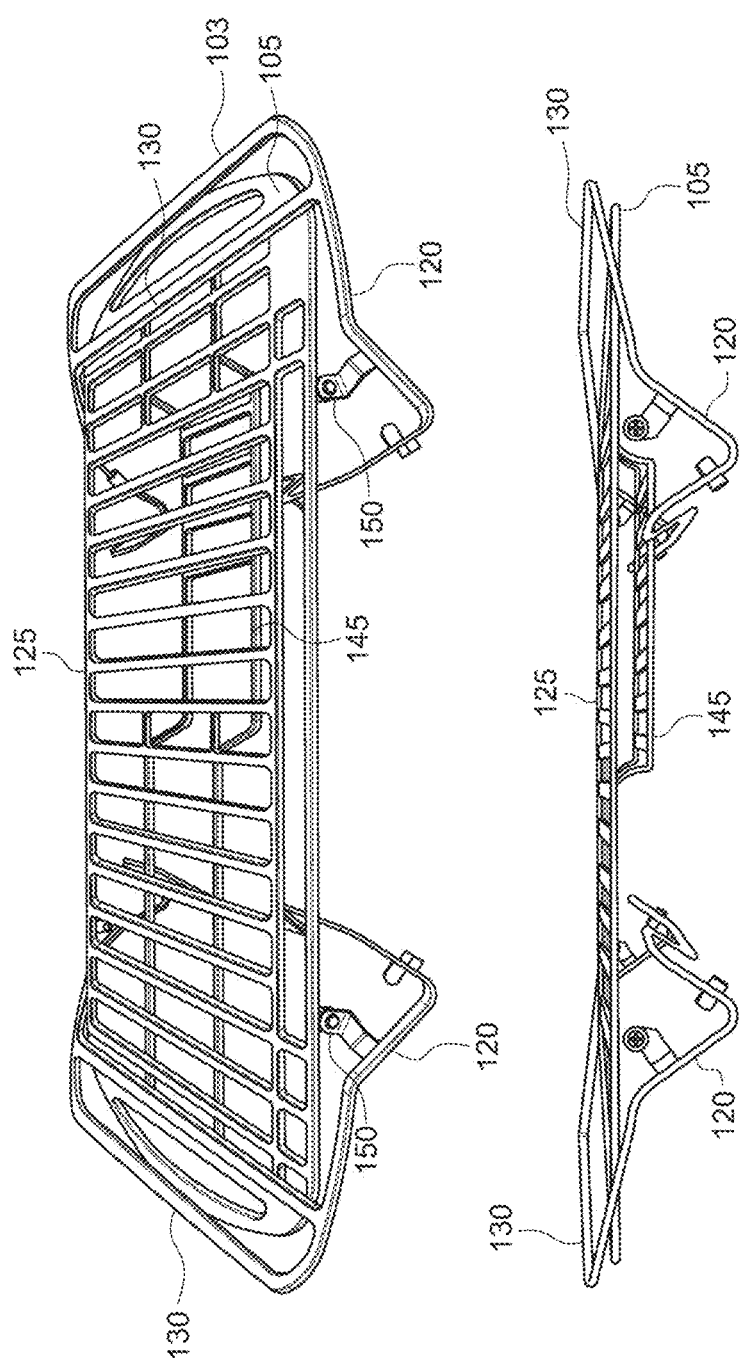
FIG. 8 illustrates the drying rack in a collapsed position where the legs and rails are pivoted into the collapsed position of decreased height.

As best shown in FIGS. 4-6 the location of the various connectable modular apparatus for supporting different kinds of kitchenware may be selectively moved base any criteria. In this embodiment, each attachment includes a hanger 320. The hanger 320 can be formed with, attached to, welded, or otherwise connected to the attachments 345, 350, and 355. The hanger can be universal in shape for multiple different accessories. The shape of the hanger 320 can conform and work in placement upon the size and position of the rails 130 of the drying rack 105. For example, the rail can include a trough 325 and tongue 330 that fit around a lowermost rail 130 of the drying rack 105. The uppermost portion of the hanger 320 can include a bend 335 that extends over and hangs from the uppermost rail 130 of the drying rack 105 as best shown in FIG. 6. As such, the weight of the accessory and kitchenware held therein is suspended from the rails 130 in a secure manner yet allowing for replacement and repositioning of the accessories thereto.

Referring still to FIG. 6, the modular attachments for glassware 355 are shown as extending from an end rail 130 at a more vertical direction. Moreover, the attachments for glassware 355 each have a silicone sleeve 356 disposed over the ends thereof for more delicately holding the glassware thereon. Referring to FIG. 6, the attachment 345 for cutlery can include an insert 346 having an internal end made from a resilient silicone material or other suitable material for engaging the ends of cutlery without damaging the tip thereof.

Figure 9:
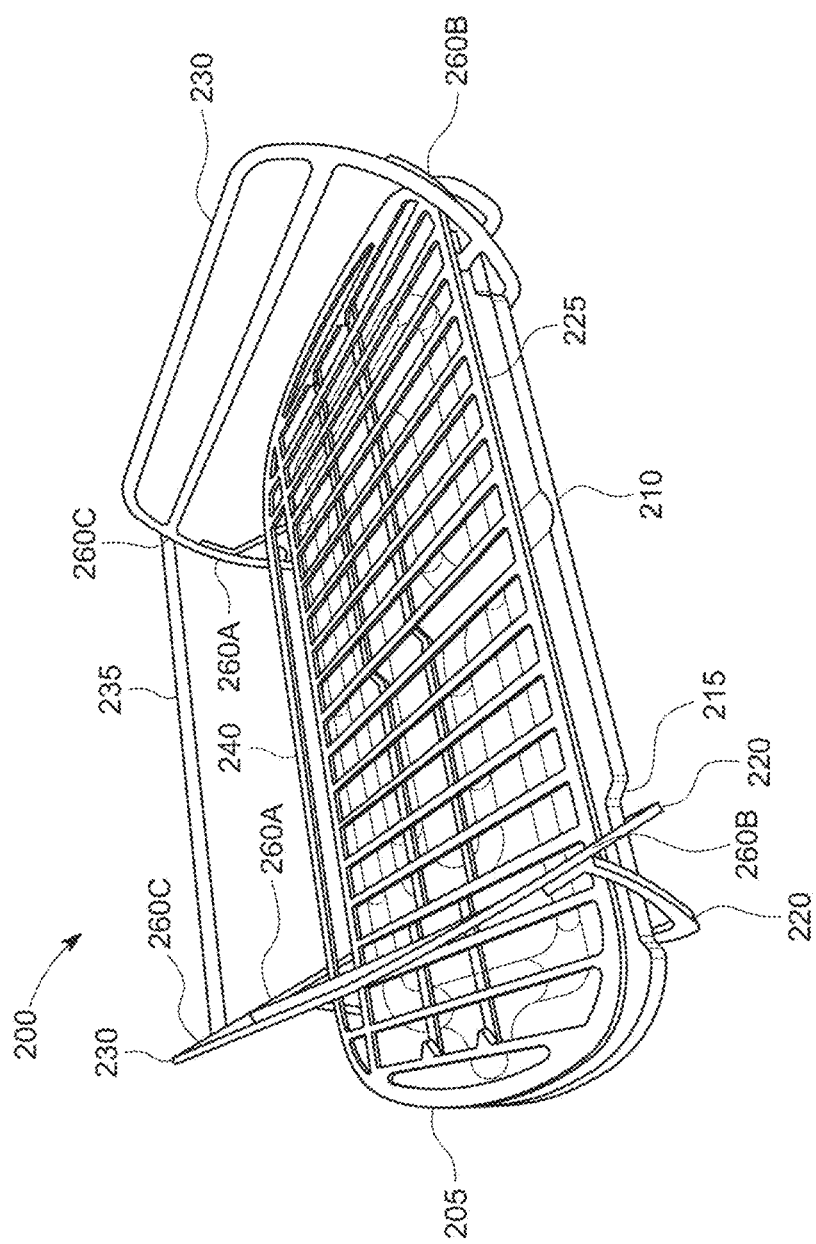
FIG. 9 illustrates an embodiment of the appliance where the legs and rails are welded at connection points.

Referring to FIG. 9, the base rack 125 can have certain sections having differently sized apertures from other sections so as to accommodate particular dishes or kitchenware such as pots, pans, etc. For example, as previously discussed the base rack 225 can have a middle section 125B that has longer apertures as opposed to end portions 125A and 125C to allow larger plates and bowels to extend there through to by also supported by a lower rack 126.

The drying rack 105 can be generally rectangular with rounded corners, having a base rack 125 and opposing downward angled end supports 130 made of metal rails. The end supports 130 can be further connected together by a connectable lateral support 135 which also provides lateral support to a cutting board or other larger dish held within a recessed receptacle 140 of the base rack 125. The recessed receptacle 140 can extend along a length of the drain tray 105 thereby allowing for additional placement of dishes within the base rack 125 and perpendicular thereto.

Figure 10:
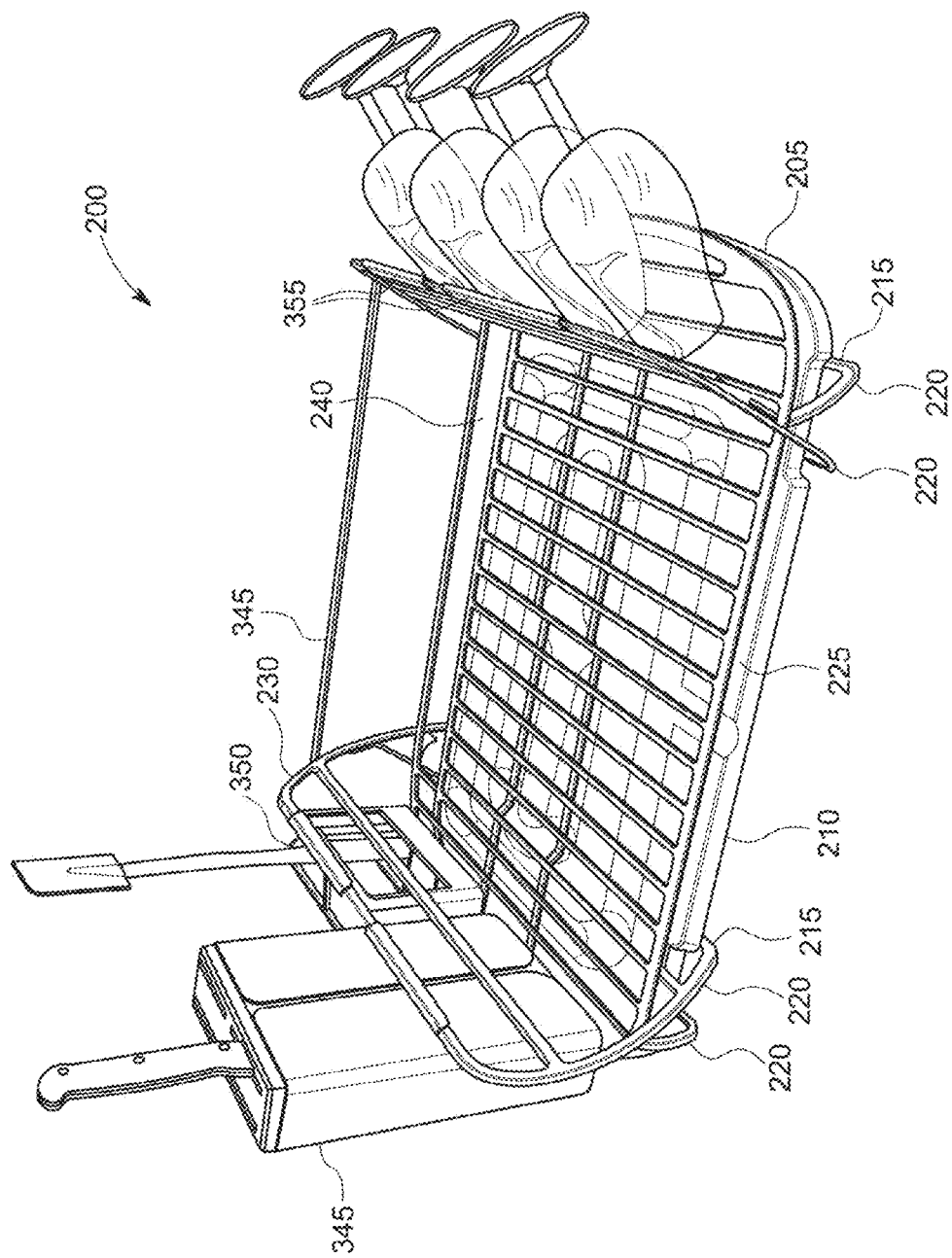
FIG. 10 illustrates the appliance with welded joints including the accessories connected thereto.

As shown in FIG. 10, the legs 120 of the drain rack 105 can be pivotally connected to the base rack 125 so as to allow the legs 120 and rails 130 to be pivoted more closely parallel to the base rack 125 so as to reduce the height of the drain rack for packaging. Upon assembly of the drying appliance, for example from the disassembled components shown in FIG. 4, the legs 120 and rails 130 of the drying rack 105 are rotated into the usable position shown in FIG. 9 where the connectors 147 of the transverse rail 145 are connected to the upright rails 130 thereby holding the upright rails 130 in place for placement of the accessories thereon. The transverse rail 145 also providing support for the cutting board there against where the cutting board is placed within the longitudinal aperture 140.

Referring again to FIGS. 9-11, the components of a second embodiment of an appliance 200 can include a drying rack 205 with components welded together and a unique design of channels formed within the drain tray 210. However, according other certain embodiments, one or more components can be attachable or connectable to one another as previously discussed. For example, according to some embodiments one or more components of the drying rack can be connectable via fasteners such as threaded screws or bolds such that they can be packaged or stored in a disassembled manner, then assembled upon use.

For example, according to the embodiment shown in FIGS. 9-11 the drying rack may include six joint locations 260 connectable by welds, screws, bolts, or other fasteners. The joints 260 can include two rear joints 260A, two front joints 260B, and two upper brace joints 260C as illustrated in FIG. 9. As such, the drying rack 205 and its components may be assemblable and disassemblable where detachable fasteners are used.

Referring to FIG. 11, the disassembled drying rack 205 and drain tray 210 is shown. The drain tray 210 can include a series of channels 260 including an outer-most channel 260A, middle channel 260B and inner-most channel 260C. The channels 260 can be interconnected to one or more outlets 265. According to the example shown in FIG. 11, the drain tray 210 can have multiple outlets 265 such that the drain tray 210 may be tilted in different direction using legs or standoffs, for example, so as to selectively choose which direction and outlet 265 for the drain tray to divert water to as shown by the arrows within the channels shown in FIG. 11. The channels 160 can be cut into the diatomaceous earth material of the drying rack 105 in some embodiments after the drying rack is formed as a solid planar sheet.

Referring still to FIGS. 9-11, the drying appliance 200 is shown including drying rack 205 and drain tray 210. The drain tray 210 is similar to the drawing tray 110 in that the drain tray 210 is generally rectangular with rounded corners and has four cutouts 215 for accommodating and locating four cantilevered legs 220 of the drain rack 205 thereby securely and precisely placing the drain tray 210 relative to the drying rack 205 when assembled according to some embodiments. The drain tray 210 is made of a diatomaceous earth wicking material as opposed to the molded plastic or rubber polymer material of the prior art thereby more rapidly drawing moisture away from dishes, glassware, and utensils placed upon the drying rack 205. The use of the diatomaceous earth drain tray 210 results in more rapid and complete evaporation of water from the dishes (not shown), drying rack 205, and drain tray 210 as previously discussed.

As compared to the previously discussed embodiment, the location of the assembly 200 relative to a sink, counter, or placement layout may not be as important because the embodiment illustrated omits the one or more drain spouts. Referring again to FIG. 4, the drain tray 110 can include a series of channels 160 including an outer-most channel 160A and a plurality of inner channels 160B. The channels 260 in the first embodiment are not interconnected to one or more outlets as in the second embodiment. According to the example shown in FIG. 4, the inventors of this patent application have found that the channels 160 in combination with the absorptive material of the drain tray 110 render one or more drain spouts unnecessary in some instances where the absorptive attributes of the train tray 110 may be devoid of an outlet where the amount of water dripped onto the absorptive drain tray 110 is absorbed and evaporated without the need for a traditional drain to un underlying sink, for example.

Figure 12A:
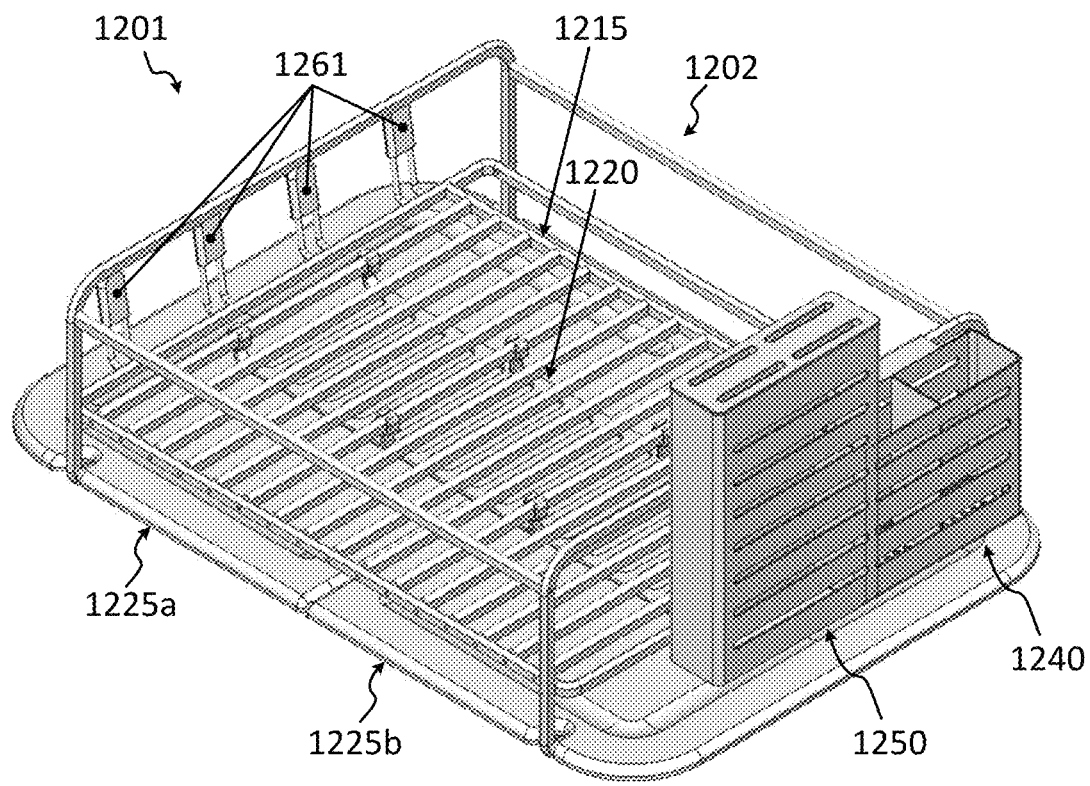
FIGS. 12A-12I illustrate various views of another exemplary drying appliance.

FIG. 12A is a top right perspective view of another exemplary drying appliance 1201. As shown, the drying appliance 1201 includes a utensil basket 1240, a knife basket 1250 and a plurality of supports 1261 (e.g., for glassware or other vessels). The drying appliance 1201 may comprise a frame 1202 (e.g., aluminum, in some embodiments; silicone or rubber-coated metal in other embodiments; silicone, plastic or another polymer in still other embodiments) that supports one or more slabs of diatomaceous earth 1225a, 1225b. A first grate 1215 may be included to form a primary drying surface that may be configured to support large objects (e.g., kitchen dishes and other articles). A second grate 1220 may be disposed below the first grate 1215 to allow certain objects (e.g., plates) to be disposed vertically-partially through the first grate 1215 and resting on the second grate 1220. The one or more diatomaceous earth slabs 1225a, 1225b may be positioned on the frame 1202 to receive and absorb water that may run off dishes or other articles disposed on the primary drying surface (e.g., the first grate 1215), in the utensil basket 1240, in the knife basket 1250 or on the plurality of supports 1261.

Figure 12B:
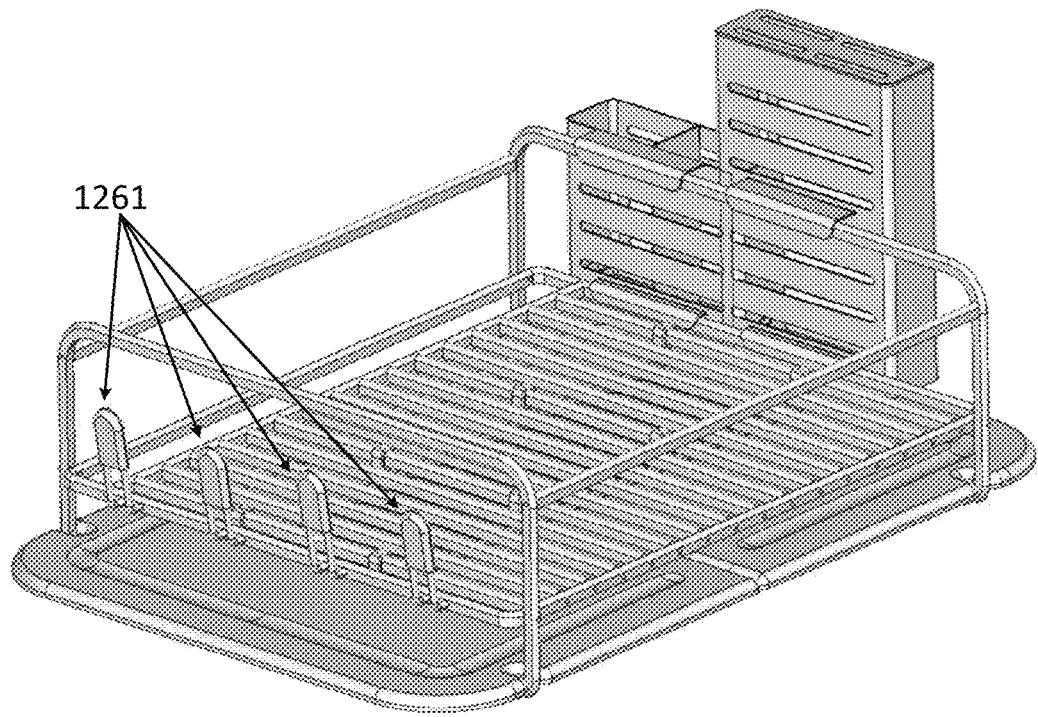
Figure 12C:
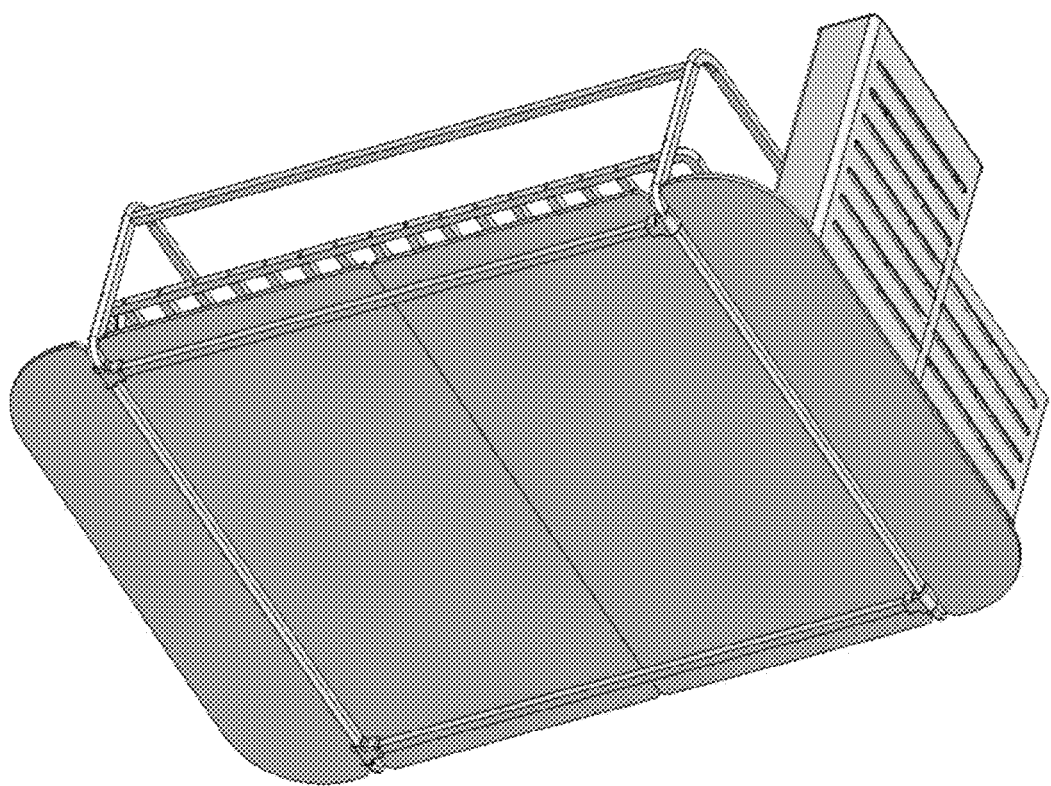
Figure 12D:
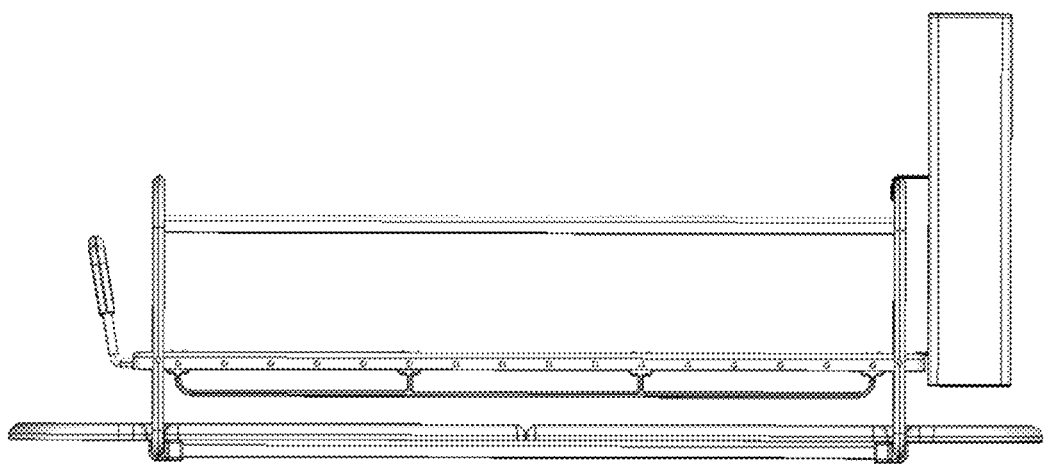
Figure 12E:
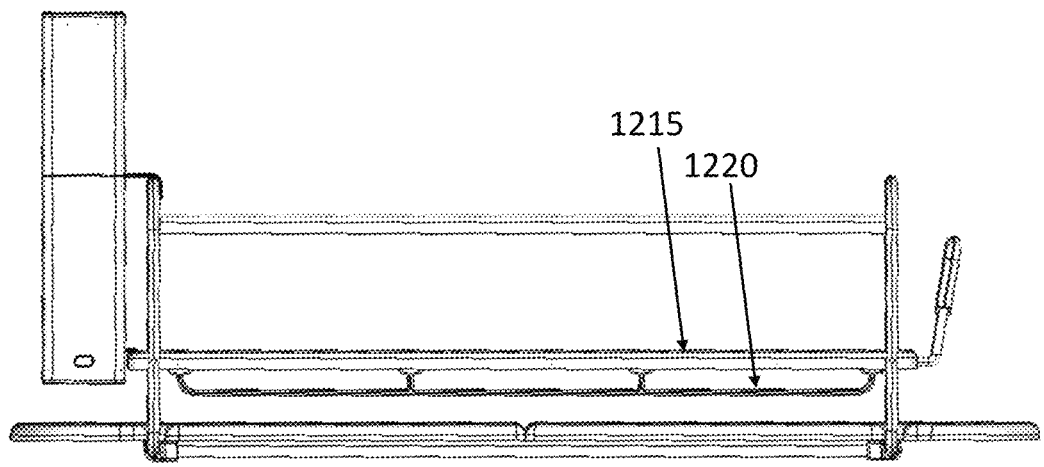
Figure 12F:
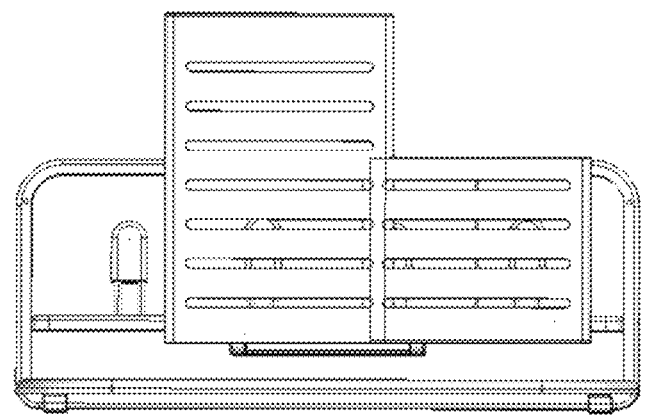
Figure 12G:
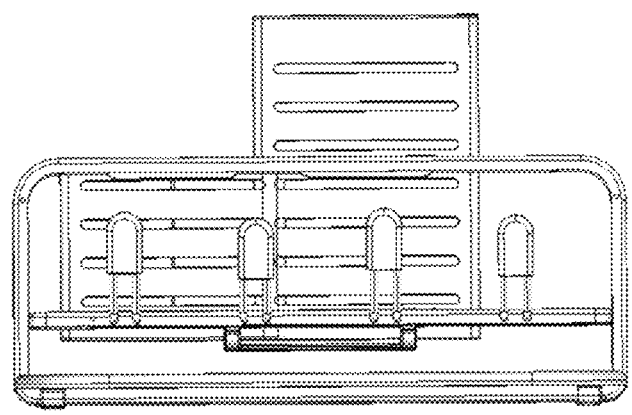
Figure 12H:
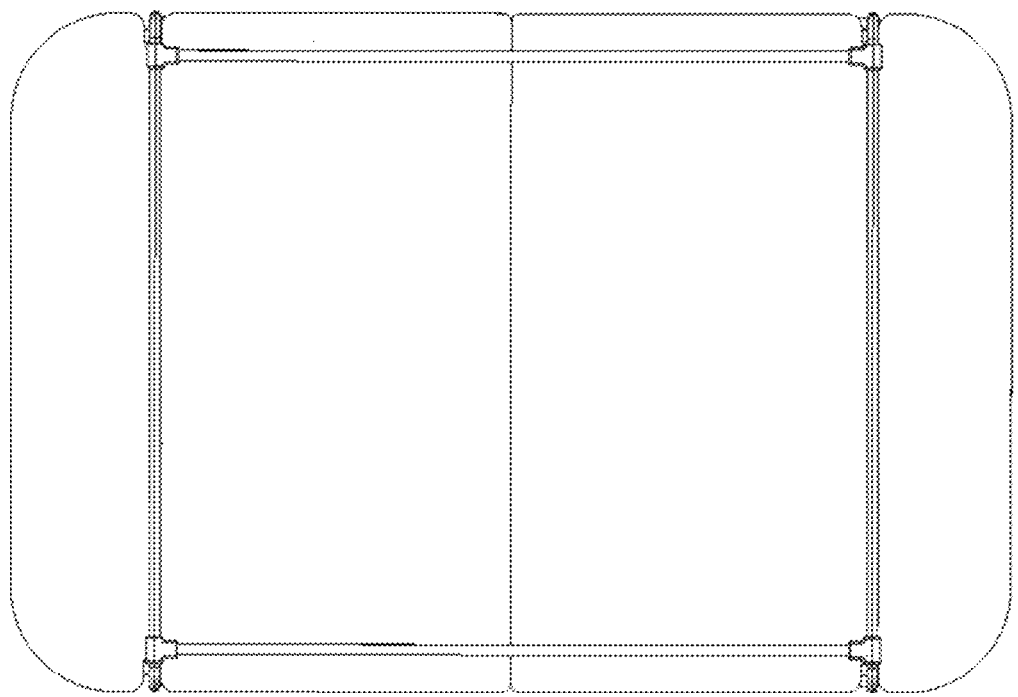
Figure 12I:
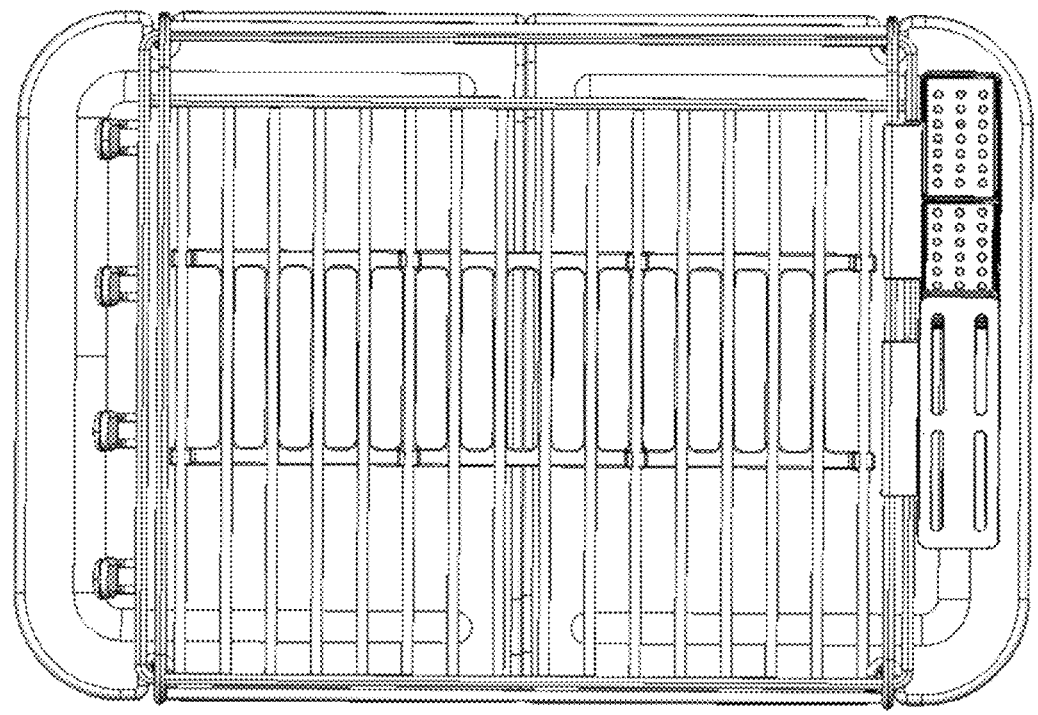

FIG. 12B is a top left perspective view of the exemplary drying appliance 1201 shown in FIG. 12A. FIG. 12C is a bottom perspective view of the same. FIG. 12D is a first side view; FIG. 12E is a second side view opposite the first side view; FIG. 12F is a first end view; FIG. 12G is a second end view, opposite the first end view; FIG. 12H is a bottom view; and FIG. 12I is a top view.

Figure 13A:
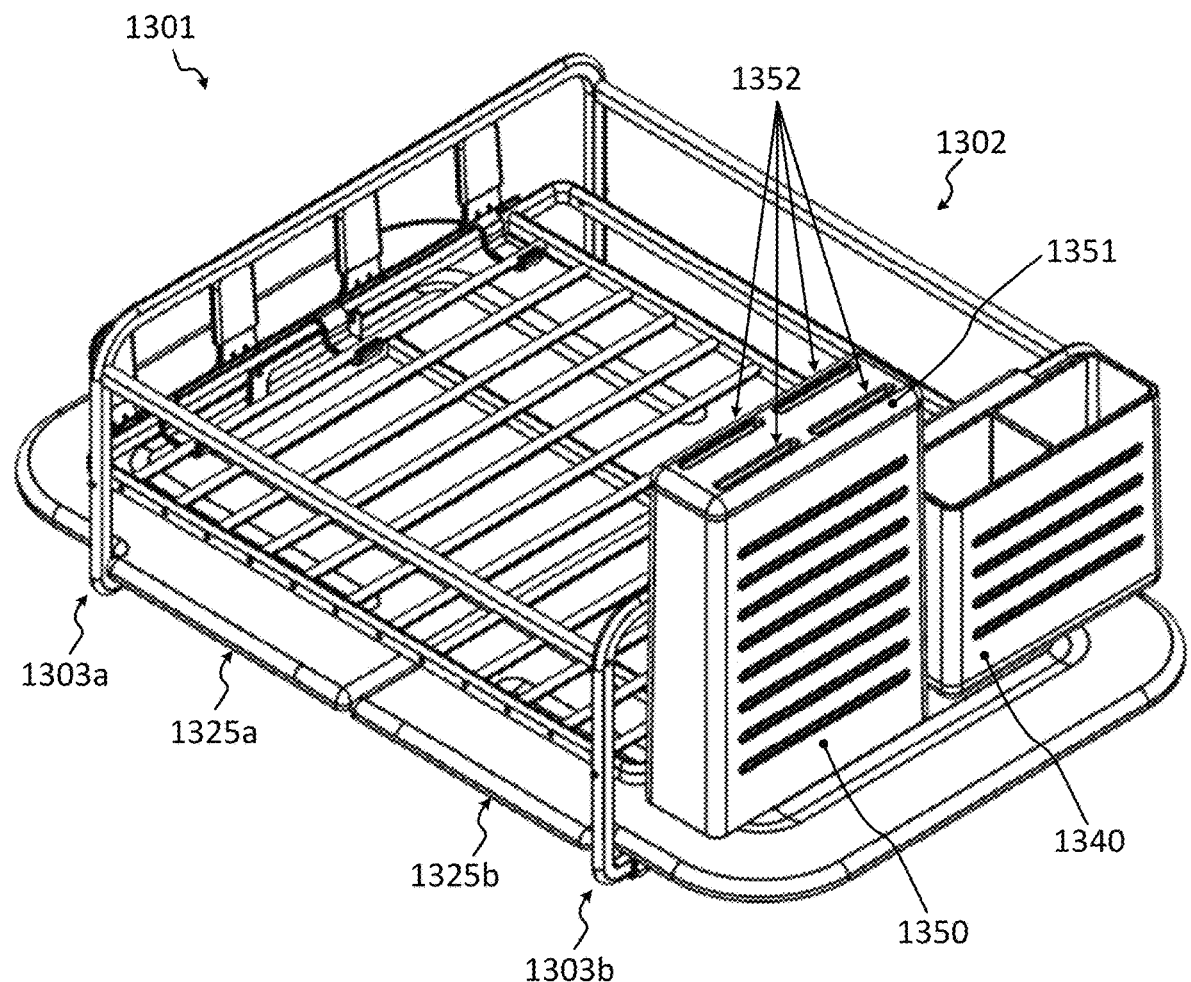
FIGS. 13A-13B illustrates perspective views of another exemplary drying appliance.
Figure 13B:
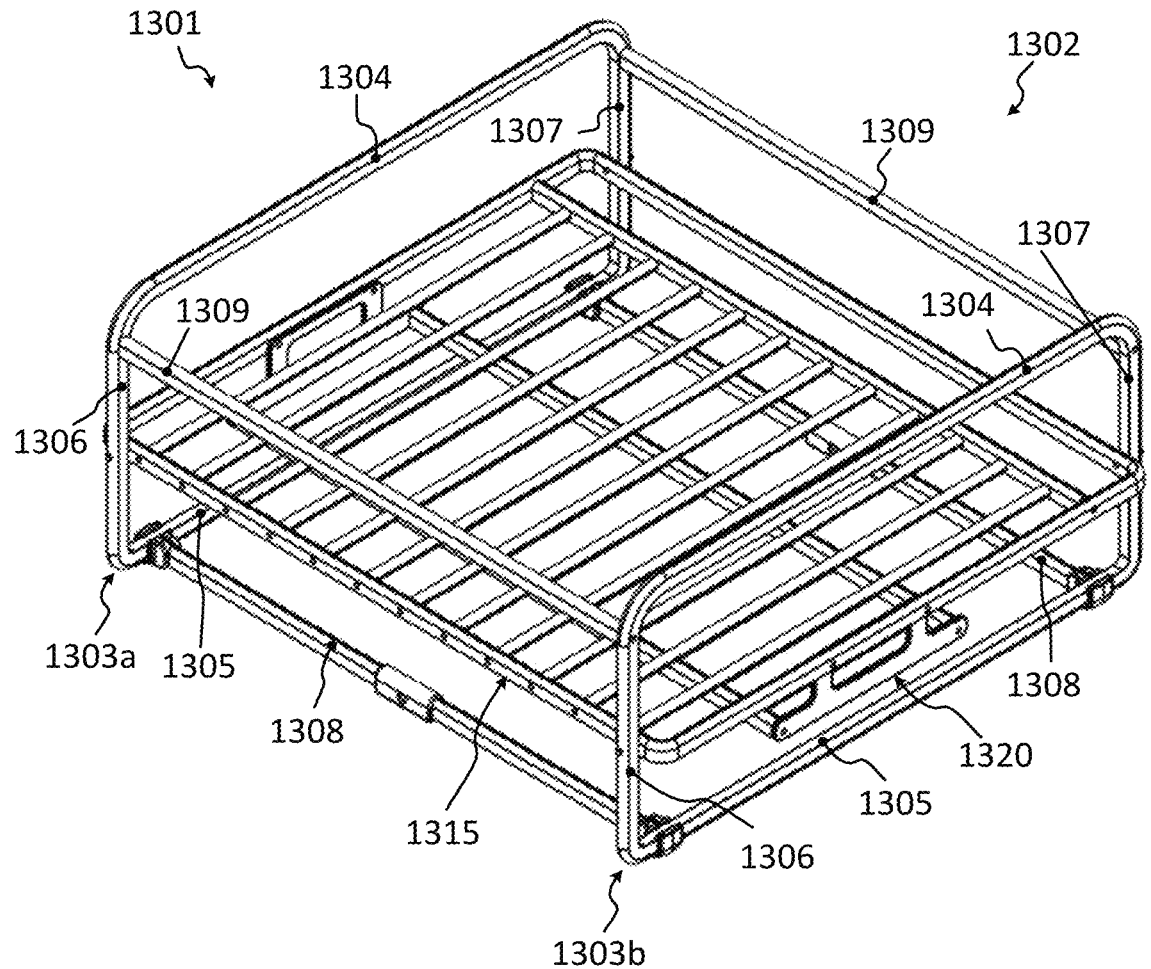

FIGS. 13A-13D illustrate another exemplary drying appliance 1301. As shown in FIGS. 13A-13B, the drying appliance 1301 includes a support frame 1302, which, as shown, includes a first rectangular end 1303a and a second rectangular end 1303b. Each of the first rectangular end 1303a and second rectangular end 1303b includes a top rail 1304; a bottom rail 1305; a first side rail 1306; and a second side rail 1307. Lower lateral rails 1308 connect the first rectangular end 1303a to the second rectangular end 1303b. In some embodiments, the connection is made at or adjacent an intersection of side rails and bottom rails (e.g., at the intersection of rails 1305 and 1306 or 1305 and 1307). Upper later rails 1309 further connect the first rectangular end 1303a to the second rectangular end 1303b.

A planar drying rack 1315 may be disposed between the upper lateral rails 1309 and the lower lateral rails 1308. The planar drying rack 1315 may be characterized by a rack width 1316 (see FIG. 13D). The planar drying rack 1315 may include a secondary grate 1320 disposed below a top surface 1317 (see FIG. 13C) of the planar drying rack 1315, and the secondary grate 1320 may have a grate width 1321 that is less than the rack width 1316. In embodiments such as just described, dishware (e.g., plate 1322) disposed vertically through apertures in the planar drying rack 1315 can be supported by the secondary grate 1320. In this context, "dishware" can include tableware (e.g., plates, bowls, etc.) as well as cookware (e.g., pots, pans, lids for the same, etc.).

As shown, the drying appliance 1301 includes an absorbent tray. As with other embodiments, the absorbent tray shown includes a first diatomaceous earth slab 1325a and a second diatomaceous earth slab 1325b. As shown in FIG. 13A, when the drying appliance 1301 is assembled for use, each of the first diatomaceous earth slab 1325a and the second diatomaceous earth slab 1325b may be disposed on the lower lateral rails 1308 and on the bottom rails 1305. The support frame 1302 may be characterized by a length 1310 (see FIG. 13C) that is parallel to the upper lateral rails 1309 and the lower lateral rails 1308, and when the drying appliance 1301 is assembled for use as shown, the first diatomaceous earth slab 1325a and the second diatomaceous earth slab 1325b may extend beyond the length 1310.

Figure 14A:
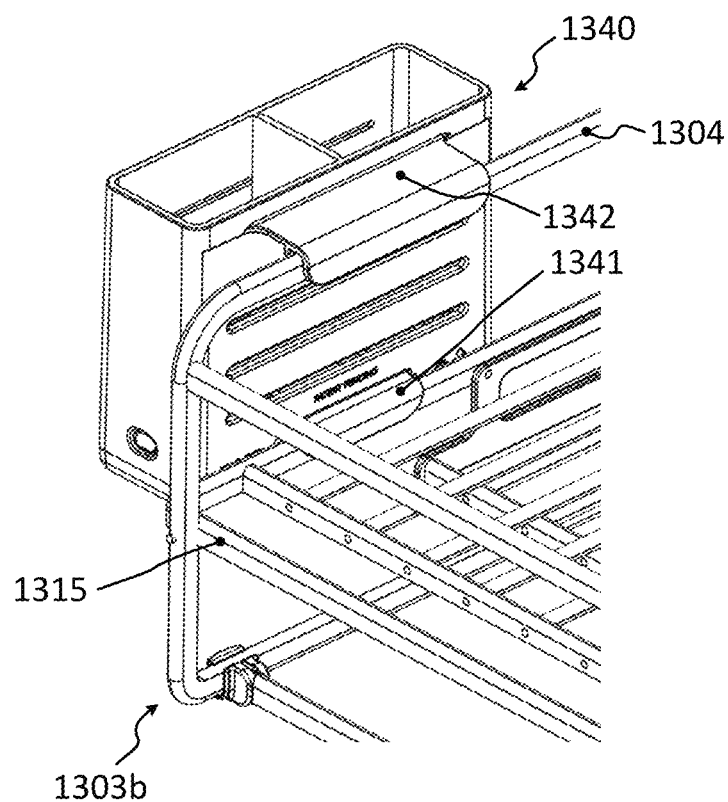
FIGS. 14A-14C illustrate detail of an exemplary utensil compartment.
Figure 14B:
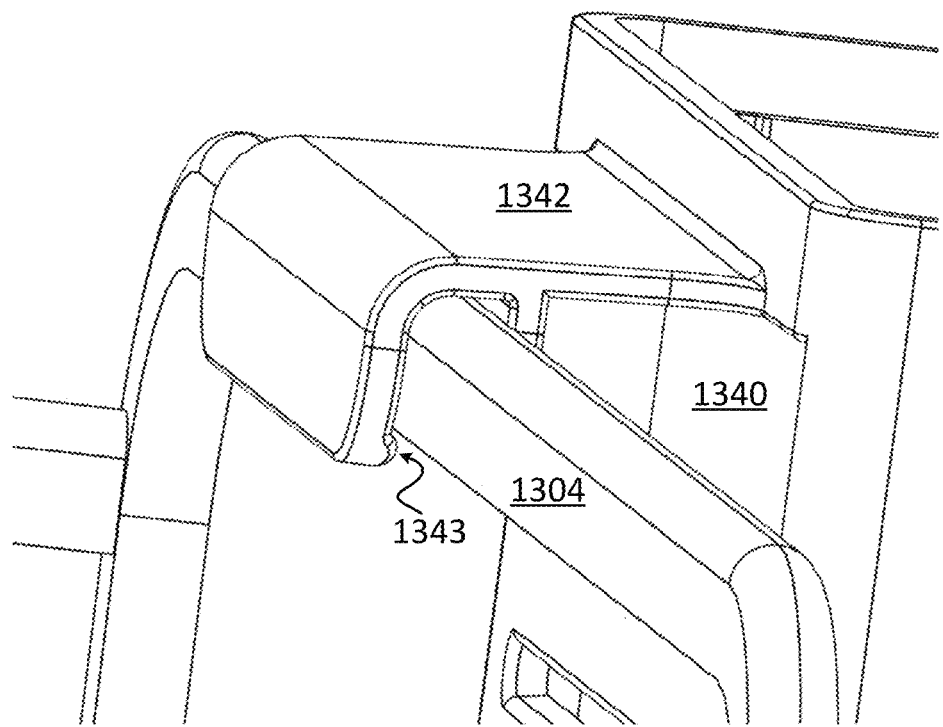
Figure 14C:
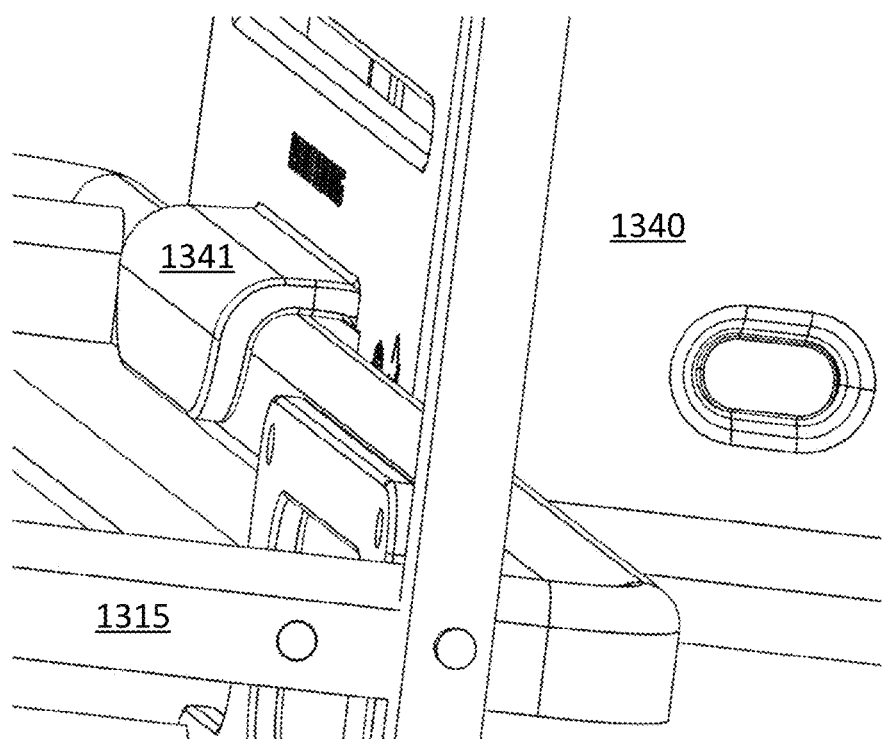

In some embodiments, the drying appliance 1301 includes a utensil compartment 1340. The utensil compartment 1340 may be configured to be disposed on one of the first rectangular end 1303a or the second rectangular end 1303b. Turning to FIGS. 14A-14C, the utensil compartment 1340 may include a lower hanger 1341 that rests on the planar drying rack 1315 and an upper hanger 1342 that couples to the respective top rail 1304 of the one of the rectangular ends (e.g., 1303b). The upper hanger 1342 may further include a detent 1343 that removably clips the utensil compartment 1340 to the top rail 1304.

Figure 13C:
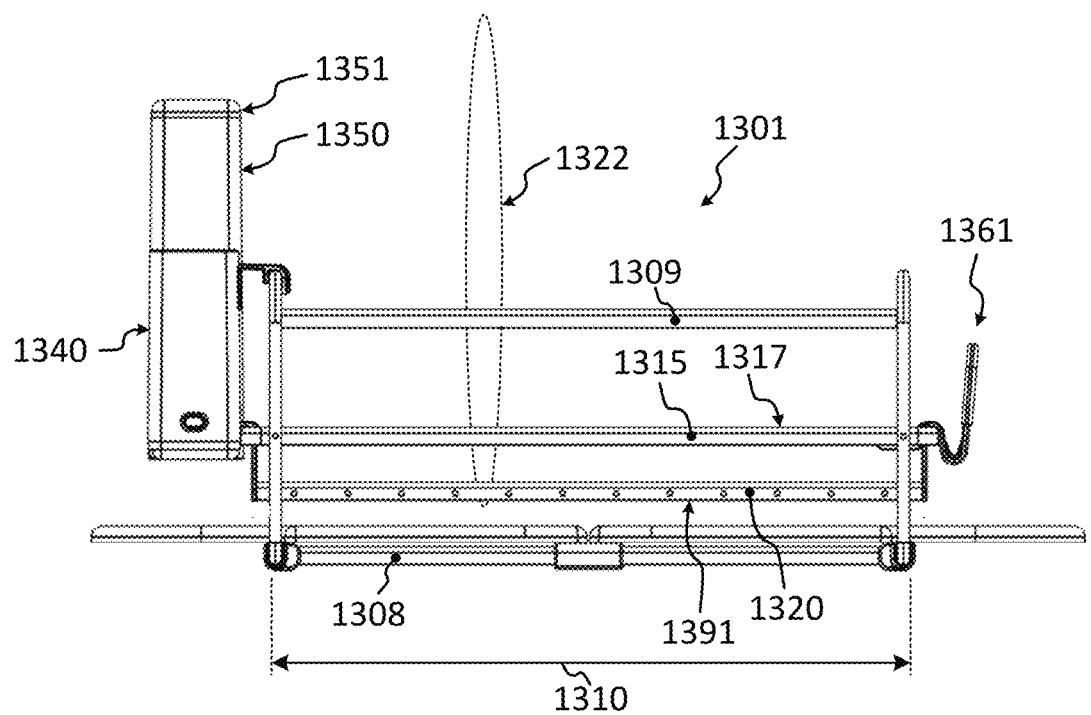
FIG. 13C illustrates a side view of the drying appliance of FIG. 13A.
Figure 13D:
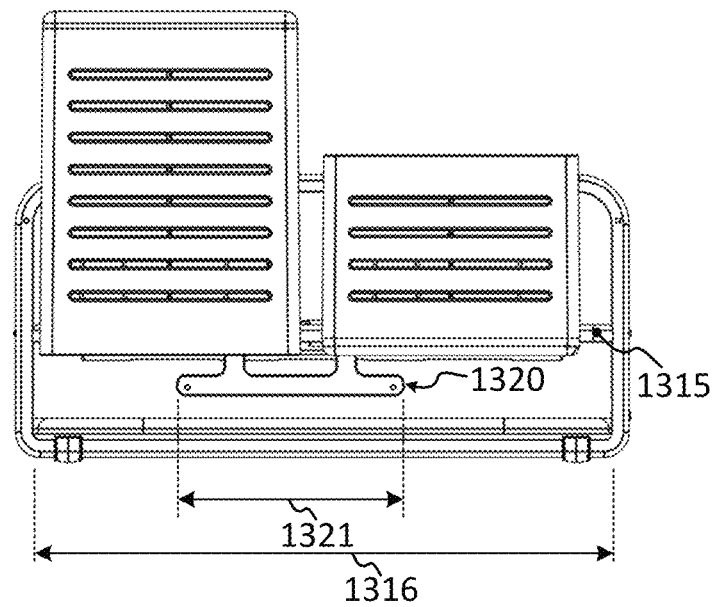
FIG. 13D illustrates an end view of the drying appliance of FIG. 13A.

In some embodiments, as shown in FIGS. 13A, 13C and 13D, the utensil compartment includes a lid 1351 that has a plurality of slits 1352 (e.g., that are configured to each receive a blade of a knife (not shown) and support such a knife upside down for drying). In some embodiments, as shown, both an open-top utensil compartment 1340 and a second utensil compartment 1350 with a lid 1351 may be provided (e.g., to facilitate drying of both knives and other flatware).

Figure 15A:
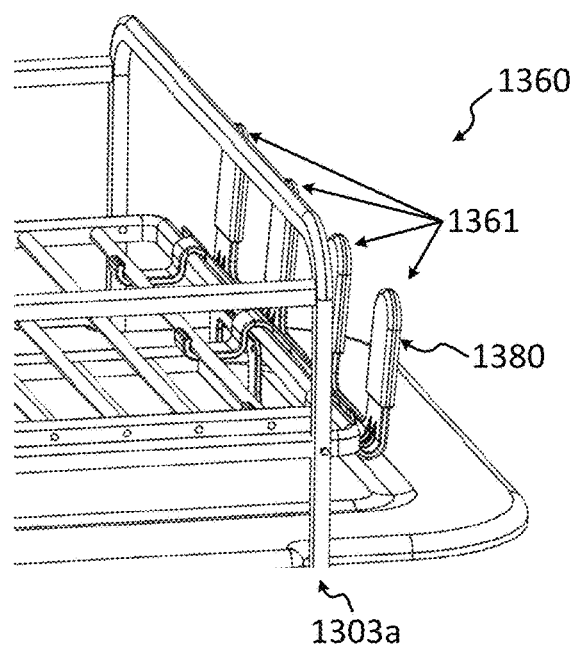
FIGS. 15A-15C illustrate detail of an exemplary glass rack.
Figure 15B:
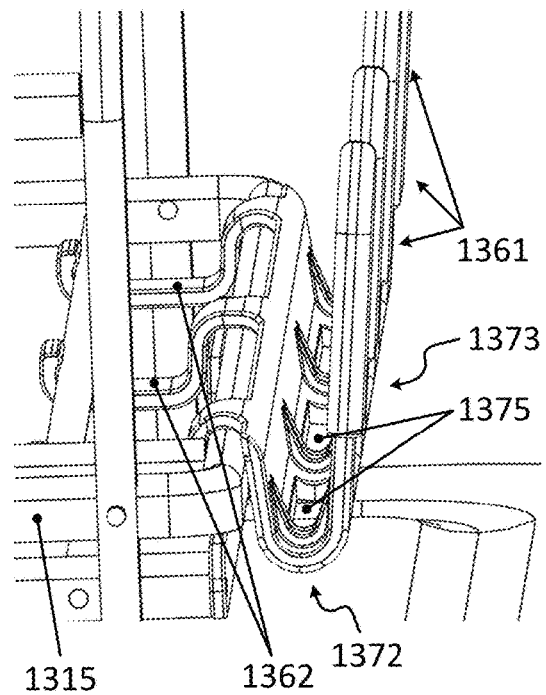
Figure 15C:
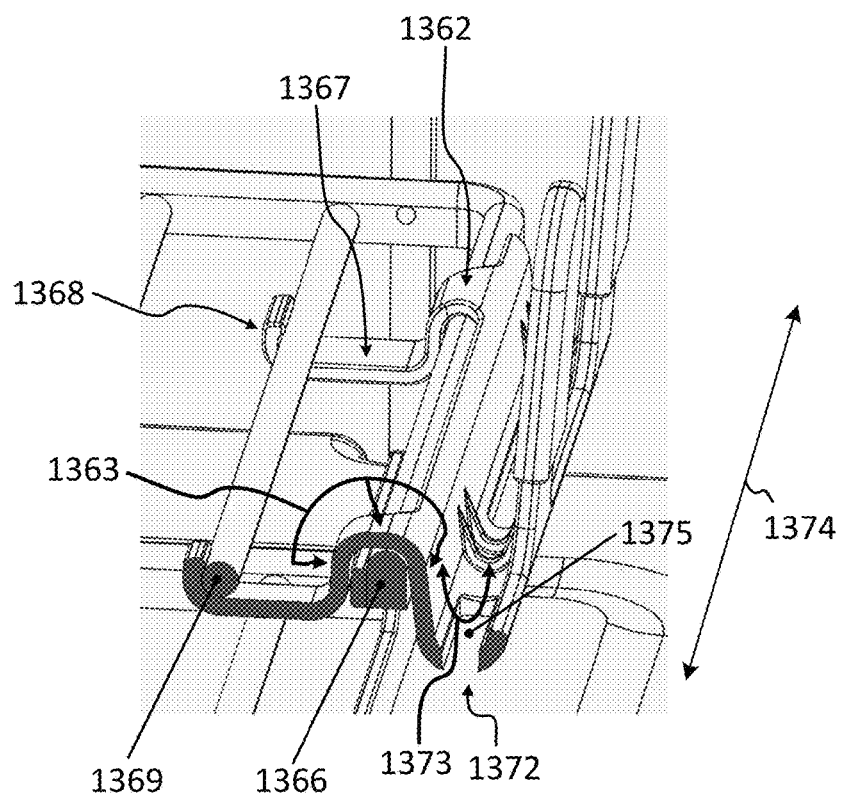

Turning to FIGS. 15A-15C, a glass rack 1360 may also be provided that is configured to be disposed on one of the first rectangular end 1303a or the second rectangular end 1303b (e.g., opposite the utensil compartment 1340). As shown, the glass rack 1360 may include a plurality of upwardly extending supports 1361 and a plurality of mounting arms 1362. Each mounting arm 1362 may include a support section 1363 that is configured to be disposed around a top and two opposing sides of a first rail 1366 on the planar drying rack 1315.

A lateral segment 1367 may extend away from the support section 1363, and a clip 1368 may be provided that is configured to contact more than one-quarter of a circumference of a second rail 1369 on the planar drying rack 1315 that is parallel to the first rail 1366. (As used herein, "circumference" may more broadly refer to "perimeter" for a rail having a non-circular cross section, and "one quarter" may more broadly refer to about 90 degrees of the cross-sectional perimeter for rails with non-circular cross sections. "About" or "approximately" may mean within 1%, 2%, 5%, 10%, 20%, 50% or 100% of a nominal value. "Substantially within" may mean within at least 20% or 50% or 90% of a nominal value.)

The glass rack 1360 may include a curved channel 1372 having a wall 1373 disposed opposite the support sections 1363 and extending along a length 1374 of the glass rack 1360; and the glass rack 1360 may include a plurality of upwardly extending glassware hangers 1361 extending away from the wall 1373 that are configured to support an upside-down item of glassware while a rim of the upside-down item of glassware is in contract with the wall 1373. One or more drainage slots 1375 may be provided in the channel 1372, and walls 1373 of the curved channel 1372 may slope towards the drainage slots 1375.

In some embodiments, a compressible and resilient cushion 1380 may be provided on the end of each of the plurality of glassware hangers 1361 (e.g., to protect fragile glassware that may be rested on the hangers 1361 for drying).

Figure 16A:
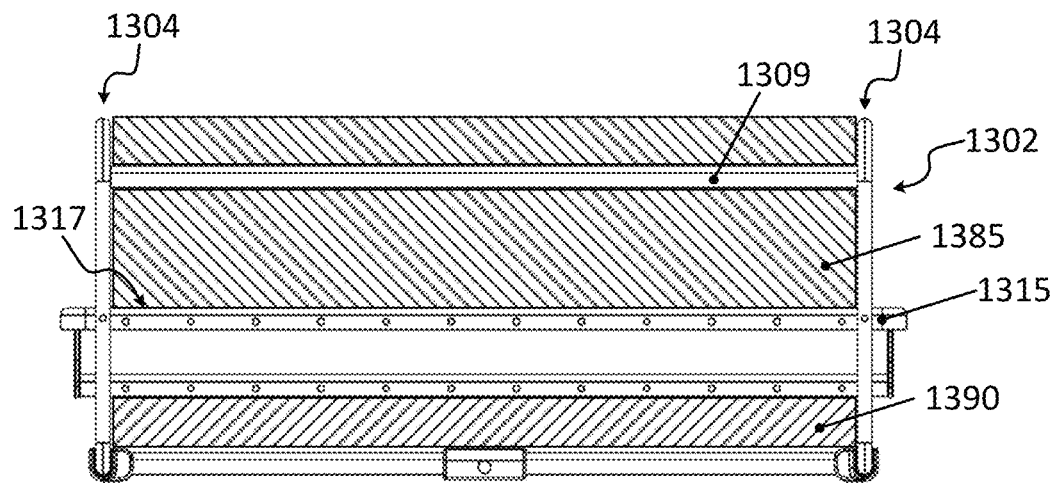
FIGS. 16A-16B illustrate exemplary interior volumes.
Figure 16B:
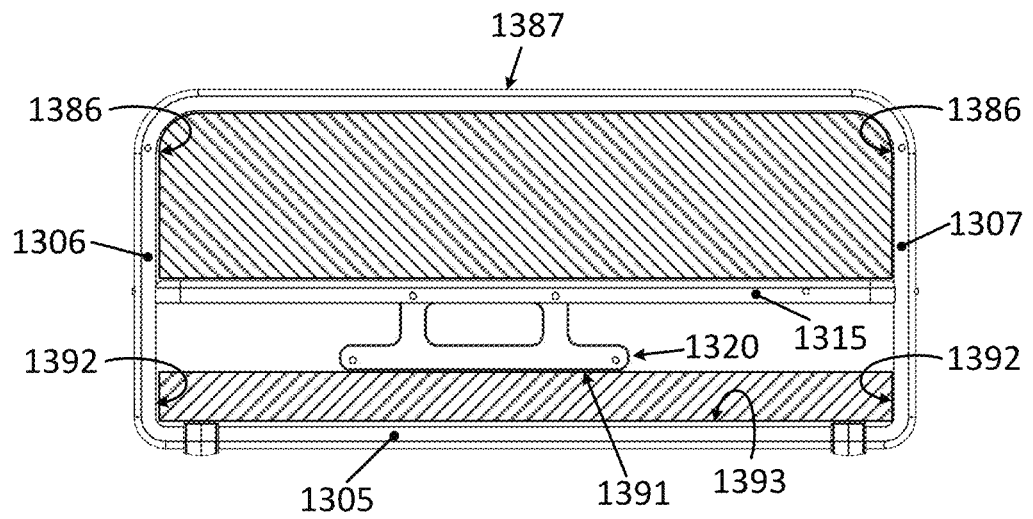

Turning to FIGS. 16A-16B, the support frame 1302 may be configured such that two interior volumes may be defined by various portions of the support frame 1302. In particular, an upper interior volume 1385 may be characterized by (e.g., bounded by or defined by) the top surface 1317 of the drying rack 1315, by inner edges 1386 of the upper lateral rails 1309, and by and upper edges 1387 of the top rails 1304. In some embodiments, the planar drying rack 1315 is free of any upwardly extending projections within the upper interior volume 1385. A lower interior volume 1390 may be characterized by (e.g., bounded by or defined by) by a bottom portion 1391 of the planar drying rack 1315 (that is, the bottom edge 1391 of the secondary grate 1320), by inner edges 1392 of the first and second side rails 1306 and 1307, and by upper edges 1393 of the bottom rails 1305.

Figure 17A:
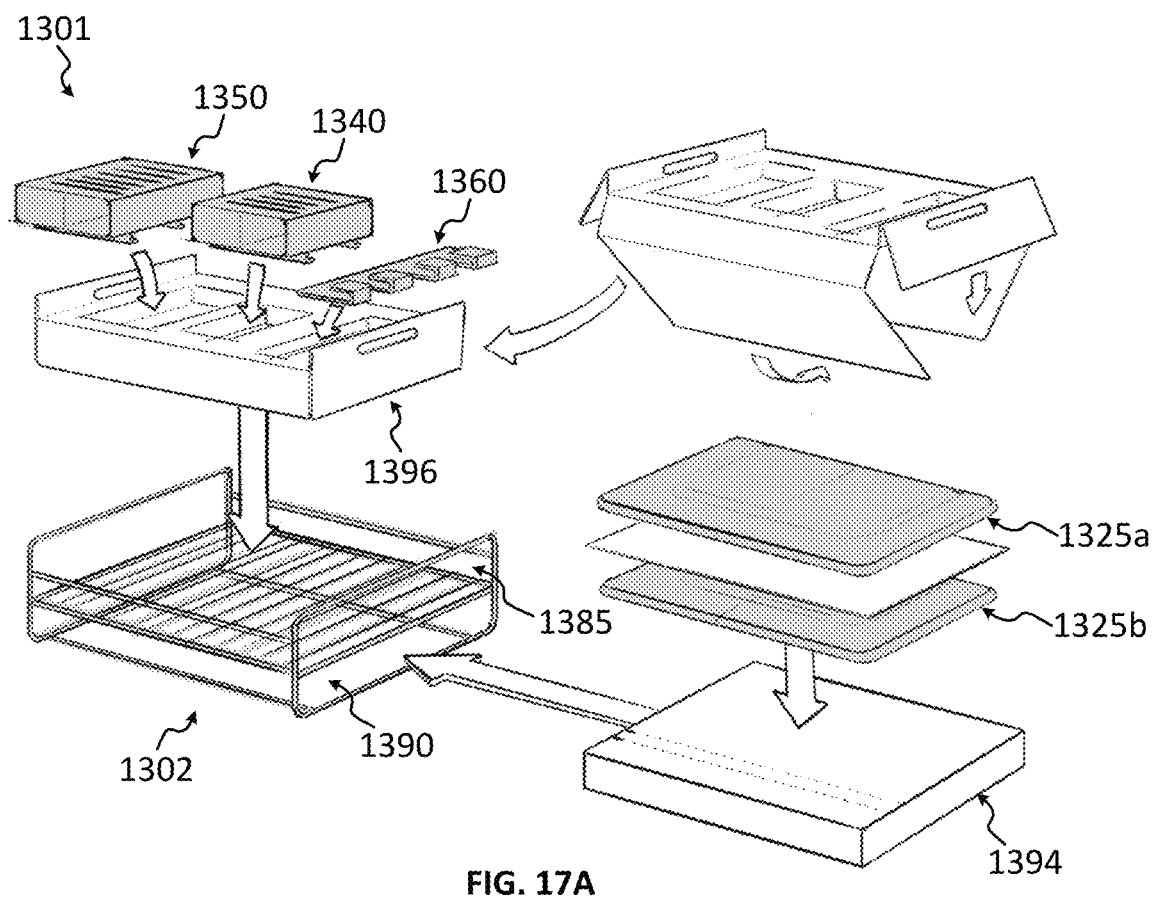
FIGS. 17A-17B illustrate exemplary packaging.
Figure 17B:
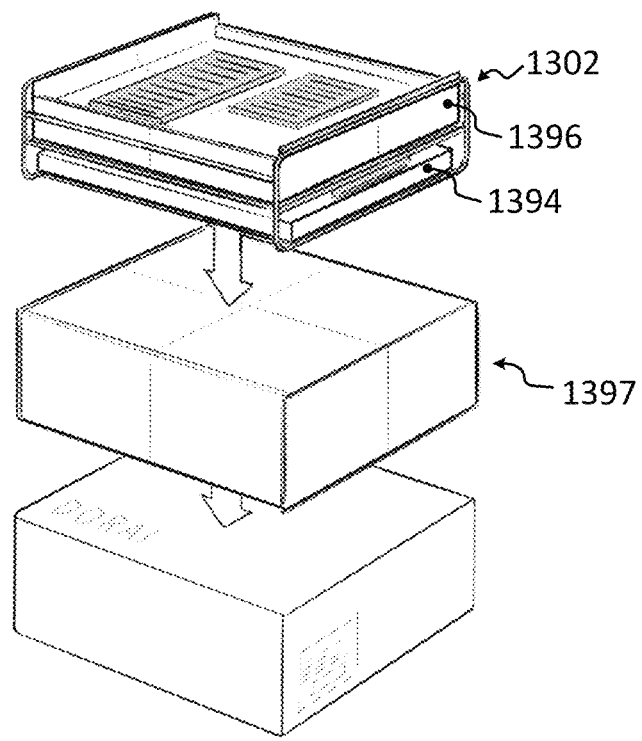

In some embodiments, as depicted in FIGS. 17A-17B, when the drying appliance 1301 is disassembled for shipment, each of the first diatomaceous earth slab 1325*a* and the second diatomaceous earth slab 1325*b* may be contained within a lower box 1394 that can be wholly contained within the lower interior volume 1390. (As used herein, "box" may refer to any suitable form of packaging, including, for example, cardboard, paper, pulp, polymer or other protective packaging that partially surrounds and protects elements therein.)

Similarly, each of the utensil compartment 1340 (and a second utensil compartment 1350, if present) and glass rack 1360 may be contained in an upper box 1396 that can be wholly contained within the upper interior volume 1385.

In such embodiments as just described, when the drying appliance 1301 is disassembled for shipment, the upper box 1396 may be disposed in the upper interior volume 1385 and the lower box 1394 may be disposed in the lower interior volume 1390 within the support frame 1302. Then, the support frame 1302, with the upper box 1396 and lower box 1394, may be disposed in an outer box 1397 for shipment, such that the support frame 1302 surrounds and protects the first diatomaceous earth slab 1325*a*, the second diatomaceous earth slab 1325*b*, the utensil compartment 1340 (and optionally, 1350) and the glass rack 1360.

While the above describes the preferred embodiments, this disclosure is not to be so restricted. Other embodiments which utilize the teachings herein set forth art intended to be within the scope and spirit of the disclosure. The present disclosure may be embodied in other specific forms without departing from its spirit or essential characteristics. For example, elements described herein as rectangular or circular may take other forms or shapes; rails may have square, rectangular, circular or other cross-sectional shapes; various materials may be used; packaging may take various forms; additional packaging may be employed; elements may be removed or other elements may be added; dimensions and proportions may be other than as described or illustrated; connections between elements may be made in various manners (e.g., with rivets, adhesive, snap connectors, removable fasteners); multiple discrete elements may be molded or formed as a unitary component; two diatomaceous earth slabs are described, but other numbers may be employed (e.g., one, three, etc.); first and second utensil compartments (e.g., an open-ended compartment and one for knives) may couple to the support frame in a similar manner. The described embodiments are to be considered in all respects only as illustrative and not restrictive. The scope is, therefore, indicated by the appended claims rather than by the foregoing description. All changes which come within the meaning and range of equivalency of the claims are to be embraced within their scope.

What is claimed is:

1. A drying appliance, comprising:
    a support frame comprising (a) a first rectangular end and a second rectangular end, each of the first rectangular end and the second rectangular end comprising a top rail, a bottom rail, a first side rail and a second side rail; (b) lower lateral rails connecting the first rectangular end to the second rectangular end adjacent intersections of the first side rails and the bottom rails or adjacent intersections of the second side rails and the bottom rails; and (c) upper lateral rails connecting the first rectangular end to the second rectangular end;
    a planar drying rack disposed between the upper lateral rails and the lower lateral rails and characterized by a rack width, the planar drying rack including a secondary grate disposed below a top surface of the planar drying rack, the secondary grate having a grate width that is less than the rack width, such that dishware disposed vertically through apertures in the planar drying rack can be supported by the secondary grate; and
    an absorbent tray comprising a first diatomaceous earth slab and a second diatomaceous earth slab;
    wherein an upper interior volume is characterized by the top surface, inner edges of the upper lateral rails and upper edges of the top rails of the first rectangular end and the second rectangular end; and wherein the planar drying rack is free of upwardly extending projections within the upper interior volume.

2. The drying appliance of claim 1, wherein the support frame is characterized by a length that is parallel to the upper lateral rails and the lower lateral rails, and wherein when the drying appliance is assembled for use, the first diatomaceous earth slab and the second diatomaceous earth slab extend beyond the length.

3. The drying appliance of claim 1, further comprising a utensil compartment that is configured to be disposed on one of the first rectangular end or the second rectangular end, the utensil compartment comprising a lower hanger that rests on the planar drying rack and an upper hanger that couples to the respective top rail of the one of the first rectangular end or the second rectangular end; the upper hanger further comprising a detent that removably clips the utensil compartment to the respective top rail.

4. The drying appliance of claim 3, further comprising a glass rack that is configured to be disposed on one of the first rectangular end or the second rectangular end, the glass rack comprising a plurality of mounting arms, each mounting arm comprising a support section that is configured to be disposed around a top and two opposing sides of a first rail on the planar drying rack, a lateral segment extending away from the support section, a clip configured to contact more than one-quarter of the circumference of a second rail on the planar drying rack that is parallel to the first rail, and a detent that removably clips the glass rack to the second rail.

5. The drying appliance of claim 4, further comprising a compressible and resilient cushion disposed on the end of each of the plurality of glassware hangers.

6. The drying appliance of claim 4, wherein the glass rack comprises a curved channel comprising a wall disposed opposite the plurality of support sections and extending along a length of the glass rack, the glass rack further comprising a plurality of glassware hangers extending away from the wall that are configured to support an upside-down item of glassware while a rim of the upside-down item of glassware is in contact with the wall.

7. The drying appliance of claim 6, wherein the curved channel comprises one or more drainage slots, and wherein walls of the curved channel slope towards the drainage slots.

8. The drying appliance of claim 4, further comprising a second utensil compartment comprising a lid comprising a plurality of slits, each of which is configured to receive a blade of a knife.

9. The drying appliance of claim 8, wherein when the drying appliance is disassembled for shipment, each of the utensil compartment, second utensil compartment and glass rack is disposed in an upper box that can be wholly contained within the upper interior volume.

10. The drying appliance of claim 9, wherein a lower interior volume is characterized by a bottom portion of the planar drying rack, inner edges of the first and second side rails, and upper edges of the bottom rails of the first rectangular end and the second rectangular end; wherein when the drying appliance is assembled for use, each of the first diatomaceous earth slab and the second diatomaceous earth slab is disposed on the lower lateral rails and the bottom rails; and wherein when the drying appliance is disassembled for shipment, each of the first diatomaceous earth slab and the second diatomaceous earth slab is disposed in a lower box that can be wholly contained within the lower interior volume.

11. The drying appliance of claim 10, wherein when the drying rack is disassembled for shipment, the support frame, the upper box disposed in the upper interior volume and the lower box disposed in the lower interior volume is disposed in an outer box for shipment, such that the support frame surrounds and protects the first diatomaceous earth slab, the second diatomaceous earth slab, the utensil compartment, the second utensil compartment and the glass rack.

12. The drying appliance of claim 1, wherein a lower interior volume is characterized by a bottom portion of the planar drying rack, inner edges of the first and second side rails, and upper edges of the bottom rails of the first rectangular end and the second rectangular end; wherein when the drying appliance is assembled for use, each of the first diatomaceous earth slab and the second diatomaceous earth slab is disposed on the lower lateral rails and the bottom rails; and wherein when the drying appliance is disassembled for shipment, each of the first diatomaceous earth slab and the second diatomaceous earth slab is disposed in a box that can be wholly contained within the lower interior volume.

13. A drying appliance, comprising:
a support frame comprising (a) a first rectangular end and a second rectangular end, each of the first rectangular end and the second rectangular end comprising a top rail, a bottom rail, a first side rail and a second side rail; (b) lower lateral rails connecting the first rectangular end to the second rectangular end adjacent intersections of the first side rails and the bottom rails or adjacent intersections of the second side rails and the bottom rails; and (c) upper lateral rails connecting the first rectangular end to the second rectangular end;
a planar drying rack disposed between the upper lateral rails and the lower lateral rails and characterized by a rack width, the planar drying rack including a secondary grate disposed below a top surface of the planar drying rack, the secondary grate having a grate width that is less than the rack width, such that dishware disposed vertically through apertures in the planar drying rack can be supported by the secondary grate; and
an absorbent tray comprising a first diatomaceous earth slab and a second diatomaceous earth slab;
wherein an upper interior volume is characterized by the top surface, inner edges of the upper lateral rails and upper edges of the top rails of the first rectangular end and the second rectangular end;
wherein the planar drying rack is free of upwardly extending projections within the upper interior volume;
wherein a lower interior volume is characterized by a bottom portion of the planar drying rack, inner edges of the first and second side rails, and upper edges of the bottom rails of the first rectangular end and the second rectangular end;
wherein when the drying appliance is assembled for use, each of the first diatomaceous earth slab and the second diatomaceous earth slab is disposed on the lower lateral rails and the bottom rails; and
wherein when the drying appliance is disassembled for shipment, each of the first diatomaceous earth slab and the second diatomaceous earth slab is disposed in a lower box that can be wholly contained within the lower interior volume.

14. A drying appliance, comprising:
a support frame comprising (a) a first rectangular end and a second rectangular end, each of the first rectangular end and the second rectangular end comprising a top rail, a bottom rail, a first side rail and a second side rail; (b) lower lateral rails connecting the first rectangular end to the second rectangular end adjacent intersections of the first side rails and the bottom rails or adjacent intersections of the second side rails and the bottom rails; and (c) upper lateral rails connecting the first rectangular end to the second rectangular end;
a planar drying rack disposed between the upper lateral rails and the lower lateral rails and characterized by a rack width, the planar drying rack including a secondary grate disposed below a top surface of the planar drying rack, the secondary grate having a grate width that is less than the rack width, such that dishware disposed vertically through apertures in the planar drying rack can be supported by the secondary grate;
an absorbent tray comprising a first diatomaceous earth slab and a second diatomaceous earth slab;
a utensil compartment that is configured to be disposed on one of the first rectangular end or the second rectangular end; and
a glass rack that is configured to be disposed on one of the first rectangular end or the second rectangular end;
wherein an upper interior volume is characterized by the top surface, inner edges of the upper lateral rails and upper edges of the top rails of the first rectangular end and the second rectangular end; and wherein the planar drying rack is free of upwardly extending projections within the upper interior volume.

15. The drying appliance of claim 14, wherein the utensil compartment comprises a lower hanger that rests on the planar drying rack and an upper hanger that couples to the respective top rail of the one of the first rectangular end or the second rectangular end; the upper hanger further comprising a detent that removably clips the utensil compartment to the respective top rail.

16. The drying appliance of claim 14, wherein the glass rack comprises a plurality of mounting arms, each mounting arm comprising a support section that is configured to be disposed around a top and two opposing sides of a first rail on the planar drying rack, a lateral segment extending away from the support section, a clip configured to contact more than one-quarter of the circumference of a second rail on the planar drying rack that is parallel to the first rail, and a detent that removably clips the glass rack to the second rail.

17. The drying appliance of claim 14, wherein a lower interior volume is characterized by a bottom portion of the planar drying rack, inner edges of the first and second side rails, and upper edges of the bottom rails of the first rectangular end and the second rectangular end; wherein when the drying appliance is assembled for use, each of the first diatomaceous earth slab and the second diatomaceous earth slab is disposed on the lower lateral rails and the bottom rails; and wherein when the drying appliance is disassembled for shipment, each of the first diatomaceous earth slab and the second diatomaceous earth slab is disposed in a lower box that can be wholly contained within the lower interior volume.

18. The drying appliance of claim 17, wherein when the drying appliance is disassembled for shipment, each of the utensil compartment and glass rack is disposed in an upper box that can be wholly contained within the upper interior volume.

19. The drying appliance of claim 18, wherein when the drying rack is disassembled for shipment, the support frame, the upper box disposed in the upper interior volume and the lower box disposed in the lower interior volume is disposed in an outer box for shipment, such that the support frame surrounds and protects the first diatomaceous earth slab, the second diatomaceous earth slab, the utensil compartment and the glass rack.

* * * * *